US012623742B2

(12) United States Patent  
Hara

(10) Patent No.: US 12,623,742 B2  
(45) Date of Patent: May 12, 2026

(54) SADDLE SENSOR ASSEMBLY, HUMAN-POWERED VEHICLE CONTROL SYSTEM COMPRISING SADDLE SENSOR ASSEMBLY, SADDLE ASSEMBLY COMPRISING SADDLE SENSOR ASSEMBLY, AND SEATPOST ASSEMBLY COMPRISING SADDLE SENSOR ASSEMBLY

(71) Applicant: Shimano Inc., Sakai (JP)

(72) Inventor: Nobukatsu Hara, Sakai (JP)

(73) Assignee: Shimano Inc., Osaka (JP)

( * ) Notice: Subject to any disclaimer, the term of this patent is extended or adjusted under 35 U.S.C. 154(b) by 253 days.

(21) Appl. No.: 17/561,713

(22) Filed: Dec. 24, 2021

(65) Prior Publication Data

US 2023/0202594 A1 Jun. 29, 2023

(51) Int. Cl.

| | |
|---|---|
| B62J 1/28 | (2006.01) |
| B62J 43/30 | (2020.01) |
| B62J 45/20 | (2020.01) |
| B62J 45/41 | (2020.01) |
| B62J 45/42 | (2020.01) |
| B62J 50/22 | (2020.01) |
| G01D 5/14 | (2006.01) |

(52) U.S. Cl.

CPC ................ B62J 1/28 (2013.01); B62J 43/30 (2020.02); B62J 45/20 (2020.02); B62J 45/41 (2020.02); B62J 45/42 (2020.02); B62J 50/22 (2020.02); G01D 5/14 (2013.01)

(58) Field of Classification Search

CPC ..... B62J 1/28; B62J 43/30; B62J 45/20; B62J 45/41; B62J 45/42; B62J 50/22; B62J 45/416; B62J 1/08; G01D 5/14

See application file for complete search history.

(56) References Cited

U.S. PATENT DOCUMENTS

| | | | |
|---|---|---|---|
| 2016/0046339 A1* | 2/2016 | Chen | H01H 9/02 |
| | | | 324/207.13 |
| 2022/0161804 A1* | 5/2022 | Fujimoto | B60W 30/08 |

OTHER PUBLICATIONS

Universal Cycles, Brooks B33 Saddle, 2016, universalcycles.com, pp. 1-2 (Year: 2016).*

Cruiser Candy, Bicycle Seat Covers, 2017, cruisercandy.com, pp. 1 (Year: 2017).*

Century Cycles, Tech Talk: Help! My seat keeps Slipping!, 2012, centurycycles.com, pp. 2-4 (Year: 2012).*

(Continued)

*Primary Examiner* — Aniss Chad

*Assistant Examiner* — Chase L Cooley

(74) *Attorney, Agent, or Firm* — Spencer Fane, LLP

(57) ABSTRACT

A saddle sensor assembly is provided to a saddle or seatpost. The saddle sensor assembly includes a first part, a second part, a third part and a sensor. The first part is configured to receive a load from a rider, and moves due to the load applied by the rider. The second part is provided closer to a seatpost than the first part. The first part is movable relative to the second part between a first position and a second position. The third part supports the first part and the second part. The third part is attached to at least one of the saddle and the seatpost. The sensor is provided to one of the first part and the second part. The sensor is configured to detect relative movement of at least one of the first part and the second part between the first position and the second position.

25 Claims, 11 Drawing Sheets

(56) References Cited

OTHER PUBLICATIONS

Littel Fuse, 55075 Series—Stainless Steel M12 Geartooth Sensor, 2020, littelfuse.com, pp. 1 (Year: 2020).*
Carl Ellis, Parts of a Bike Diagram: Bicycle Anatomy for Beginners, Jul. 3, 2021, thebestbikelock.com, pp. 2 and 13 (Year: 2021).*
Logan, Suspension Seatposts: A Complete List, Tested and Explained, 2020, bikepacking.com, pp. 2-6 (Year: 2020).*

* cited by examiner

SADDLE SENSOR ASSEMBLY, HUMAN-POWERED VEHICLE CONTROL SYSTEM COMPRISING SADDLE SENSOR ASSEMBLY, SADDLE ASSEMBLY COMPRISING SADDLE SENSOR ASSEMBLY, AND SEATPOST ASSEMBLY COMPRISING SADDLE SENSOR ASSEMBLY

BACKGROUND

Technical Field

This disclosure generally relates to a saddle sensor assembly, a human-powered vehicle control system comprising a saddle sensor assembly, a saddle assembly comprising a saddle sensor assembly and a seatpost assembly comprising a saddle sensor assembly.

Background Information

In recent years, some human-powered vehicles are provided with electric components or devices that are automatically adjusted based on at least one riding condition. For example, U.S. Patent Application Publication No. 2016/0046339 discloses adjusting a suspension of a bicycle based on a riding posture of a rider.

SUMMARY

Generally, the present disclosure is directed to various features of a saddle sensor assembly for a human-powered vehicle. The term "human-powered vehicle" as used herein refers to a vehicle that can be driven by at least human driving force, but does not include a vehicle using only a driving power other than human power. In particular, a vehicle solely using an internal combustion engine as a driving power is not included in the human-powered vehicle. The human-powered vehicle is generally assumed to be a compact, light vehicle that sometimes does not require a license for driving on a public road. The number of wheels on the human-powered vehicle is not limited. The human-powered vehicle includes, for example, a monocycle and a vehicle having three or more wheels. The human-powered vehicle includes, for example, various types of bicycles such as a mountain bike, a road bike, a city bike, a cargo bike, and a recumbent bike, and an electric assist bicycle (E-bike).

In view of the state of the known technology and in accordance with a first aspect of the present disclosure, a saddle sensor assembly is provided for a saddle. The saddle sensor assembly comprises a first part, a second part, a third part and a sensor. The first part is configured to receive a load from a rider. The first part is configured to be movable due to the load applied by the rider. The second part is provided closer to a seatpost than the first part. The first part is configured to be movable relative to the second part between a first position and a second position. The third part supports the first part and the second part. The third part is configured to be attached to at least one of the saddle and the seatpost. The sensor is provided to one of the first part and the second part. The sensor is configured to detect relative movement of at least one of the first part and the second part between the first position and the second position.

With the saddle sensor assembly according to the first aspect, it is possible to reliably detect a load applied to the first part from a rider.

In accordance with a second aspect of the present disclosure, the saddle sensor assembly according to the first aspect is configured so that the first part is movably connected to the second part.

With the saddle sensor assembly according to the second aspect, the sensor can detect a load applied to the first part from a rider in accordance with the movement of the first part.

In accordance with a third aspect of the present disclosure, the saddle sensor assembly according to the second aspect is configured so that the first part is pivotally connected to the second part.

With the saddle sensor assembly according to the third aspect, the first part can be easily moved relative to the second part when a load is applied from a rider to the first part.

In accordance with a fourth aspect of the present disclosure, the saddle sensor assembly according to any one of the first aspect to the third aspect is configured so that the first part is connected to the second part by a first connection and a second connection so that a distance between the first connection and the second connection is longer than a distance between the second connection and the sensor.

With the saddle sensor assembly according to the fourth aspect, the first part can be firmly connected to the second part in a movable manner so as to reliably detect the relative movement of at least one of the first part and the second part.

In accordance with a fifth aspect of the present disclosure, the saddle sensor assembly according to any one of the first aspect to the fourth aspect is configured so that the first part has an upper surface configured to be positioned above a seat surface of the saddle in a case where the saddle sensor assembly is attached.

With the saddle sensor assembly according to the fifth aspect, a load is applied from a rider to the first part can be quickly and reliably detected.

In accordance with a sixth aspect of the present disclosure, the saddle sensor assembly according to any one of the first aspect to the fifth aspect further comprises a sensed element protruding downward from the first part toward the sensor provided to the second part.

With the saddle sensor assembly according to the sixth aspect, the sensor can be easily detect the movement of detect the movement of the first part toward the second part.

In accordance with a seventh aspect of the present disclosure, the saddle sensor assembly according to any one of the first aspect to the sixth aspect is configured so that the sensor includes a contact sensor.

With the saddle sensor assembly according to the seventh aspect, it is possible to reliably and easily detect the relative movement of at least one of the first part and the second part using a contact sensor.

In accordance with an eighth aspect of the present disclosure, the saddle sensor assembly according to any one of the first aspect to the sixth aspect is configured so that the sensor includes a non-contact sensor.

With the saddle sensor assembly according to the eighth aspect, it is possible to reliably and easily detect the relative movement of at least one of the first part and the second part using a non-contact sensor.

In accordance with a ninth aspect of the present disclosure, the saddle sensor assembly according to any one of the first aspect to the eighth aspect further comprises a fourth part adjustably connecting the second part in a longitudinal direction of the saddle.

With the saddle sensor assembly according to the ninth aspect, the saddle sensor assembly can be adjusted relative to the saddle in the longitudinal direction of the saddle.

In accordance with a tenth aspect of the present disclosure, the saddle sensor assembly according to the ninth aspect is configured so that the fourth part includes at least one opening extending in the longitudinal direction of the saddle, and the fourth part is adjustably connected to the second part by at least one positioning member that extends through the at least one opening in the fourth part.

With the saddle sensor assembly according to the tenth aspect, the saddle sensor assembly can be easily adjusted relative to the saddle in the longitudinal adjustment using at least one opening and at least one positioning member.

In accordance with an eleventh aspect of the present disclosure, the saddle sensor assembly according to any one of the first aspect to the tenth aspect is configured so that the third part is configured to be attached to a pair of saddle rails of the saddle.

With the saddle sensor assembly according to the eleventh aspect, the saddle sensor assembly can be easily mounted to the saddle via the saddle rails.

In accordance with a twelfth aspect of the present disclosure, the saddle sensor assembly according to any one of the first aspect to the tenth aspect is configured so that the third part is integrated with a saddle clamp of the seatpost.

With the saddle sensor assembly according to the twelfth aspect, the saddle sensor assembly and the saddle can be easily mounted together to the seatpost.

In accordance with a thirteenth aspect of the present disclosure, the saddle sensor assembly according to any one of the first aspect to the twelfth aspect further comprises a support structure configured to support the first part and the second part, wherein the support structure includes a damping part configured to dampen a load applied to the first part.

With the saddle sensor assembly according to the thirteenth aspect, the saddle sensor assembly can move relative to the saddle so as to avoid any discomfort to the rider sitting on the saddle.

In accordance with a fourteenth aspect of the present disclosure, the saddle sensor assembly according to the thirteenth aspect further comprises a restricting part configured to restrict movement of the first part and the second part relative to the support structure.

With the saddle sensor assembly according to the fourteenth aspect, the amount of movement between the first part and the second part can be appropriately regulated.

In accordance with a fifteenth aspect of the present disclosure, the saddle sensor assembly according to any one of the sixth aspect to the fourteenth aspect is configured so that the sensed element is adjustably coupled to the first part to adjust a distance between the sensed element and the sensor.

With the saddle sensor assembly according to the fifteenth aspect, the distance between the sensed element and the sensor can be adjusted to properly calibrate the sensing of the sensed element by the sensor.

In accordance with a sixteenth aspect of the present disclosure, the saddle sensor assembly according to the fifteenth aspect is configured so that the sensed element is threadedly coupled to the first part.

With the saddle sensor assembly according to the sixteenth aspect, the sensed element can be easily adjusted to calibrate the sensing of the sensed element by the sensor.

In accordance with a seventeenth aspect of the present disclosure, a human-powered vehicle control system comprises the saddle sensor assembly according to any one of the first aspect to the sixteenth aspect, and further comprises a controller configured to receive a signal from the sensor, and configured to determine a rider's condition.

With the human-powered vehicle control system according to the seventeenth aspect, the detection result of the sensor can be used to determine a rider's condition.

In accordance with an eighteenth aspect of the present disclosure, the human-powered vehicle control system according to the seventeenth aspect is configured so that the rider's condition includes a rider's posture.

With the human-powered vehicle control system according to the eighteenth aspect, a rider's posture can be used as the rider's condition by the sensor.

In accordance with a nineteenth aspect of the present disclosure, the human-powered vehicle control system according to the eighteenth aspect is configured so the rider's posture includes at least one of sitting and standing.

With the human-powered vehicle control system according to the nineteenth aspect, at least one of sitting and standing can be detected by the sensing part to indicate the rider's posture.

In accordance with a twentieth aspect of the present disclosure, the human-powered vehicle control system according to any one of the seventeenth aspect to the nineteenth aspect is configured so that the rider's condition includes an estimation of a rider's fatigue.

With the human-powered vehicle control system according to the twentieth aspect, the controller can estimate a rider's fatigue based on the detection results by the sensing part.

In accordance with a twenty-first aspect of the present disclosure, the human-powered vehicle control system according to any one of the seventeenth aspect to the twentieth aspect further comprises a data storage device electrically connected to the controller, and configured to store a reference value to determine the rider's condition.

With the saddle sensor assembly according to the twenty-first aspect, a reference value stored in the data storage device can be compared with the detection results by the sensing part to determine the rider's condition.

In accordance with a twenty-second aspect of the present disclosure, the human-powered vehicle control system according to any one of the seventeenth aspect to the twenty-first aspect further comprises a wireless communicator electrically connected to the controller, and configured to wirelessly transmit the rider's condition from the controller.

With the human-powered vehicle control system according to the twenty-second aspect, the rider's condition can be transmitted from the controller to a vehicle component without the need of an electrical wire.

In accordance with a twenty-third aspect of the present disclosure, the human-powered vehicle control system according to the twenty-second aspect is configured so that the wireless communicator is configured to wirelessly receive commands for the controller.

With the human-powered vehicle control system according to the twenty-third aspect, the controller can wirelessly receive commands for changing prestored data and/or for changing detection or analysis processes carried out by the controller.

In accordance with a twenty-fourth aspect of the present disclosure, the human-powered vehicle control system according to any one of the seventeenth aspect to the twenty-third aspect further comprises a display device configured to receive information from the controller, and configured to display the rider's condition.

With the human-powered vehicle control system according to the twenty-fourth aspect, a rider can be notified of the rider's condition on a display.

In accordance with a twenty-fifth aspect of the present disclosure, the human-powered vehicle control system according to any one of the seventeenth aspect to the twenty-fourth aspect further comprises a power source configured to supply electric power to the human-powered control system.

With the human-powered vehicle control system according to the twenty-fifth aspect, the electrical components can receive electric power from the power source.

In accordance with a twenty-sixth aspect of the present disclosure, the human-powered vehicle control system according to any one of the seventeenth aspect to the twenty-fifth aspect further comprises a human-powered vehicle component configured to receive commands from the controller to perform a predetermined action according to the rider's condition.

With the human-powered vehicle control system according to the twenty-sixth aspect, a human-powered vehicle component can be controlled to perform a predetermined action according to the rider's condition that was detected by the saddle sensor assembly.

In accordance with a twenty-seventh aspect of the present disclosure, a saddle assembly comprises the saddle and a saddle sensor assembly that is attached to the saddle. The saddle sensor assembly comprises a first part, a second part, a third part and a sensor. The first part is configured to receive a load from a rider. The first part is configured to be movable due to the load applied by the rider. The second part is provided closer to a seatpost than the first part. The first part is configured to be movable relative to the second part between a first position and a second position. The third part supports the first part and the second part. The third part is attached to at least one of the saddle. The sensor is provided to one of the first part and the second part. The sensor is configured to detect relative movement of at least one of the first part and the second part between the first position and the second position.

With the saddle sensor assembly according to the twenty-seventh aspect, the saddle sensor assembly can be integrated into a saddle.

In accordance with a twenty-eighth aspect of the present disclosure, a seatpost assembly comprises a seatpost and a saddle sensor assembly that is attached to the seatpost. The saddle sensor assembly comprises a first part, a second part, a third part and a sensor. The first part is configured to receive a load from a rider. The first part is configured to be movable due to the load applied by the rider. The second part is provided closer to a seatpost than the first part. The first part is configured to be movable relative to the second part between a first position and a second position. The third part supports the first part and the second part. The third part is attached to and the seatpost. The sensor is provided to one of the first part and the second part. The sensor is configured to detect relative movement of at least one of the first part and the second part between the first position and the second position.

With the saddle sensor assembly according to the twenty-eighth aspect, it is possible to integrate the saddle sensor assembly to the seatpost so that variety of saddles can be used with the seatpost assembly.

Also, other objects, features, aspects and advantages of the disclosed saddle sensor assembly, the disclosed human-powered vehicle control system, the disclosed saddle assembly and the disclosed seatpost assembly will become apparent to those skilled in the art from the following detailed description, which, taken in conjunction with the annexed drawings, discloses preferred embodiments.

BRIEF DESCRIPTION OF THE DRAWINGS

Referring now to the attached drawings which form a part of this original disclosure.

Referring now to the attached drawings which form a part of this original disclosure.

DETAILED DESCRIPTION OF EMBODIMENTS

Selected embodiments will now be explained with reference to the drawings. It will be apparent to those skilled in the human-powered vehicle field (e.g., the bicycle field) from this disclosure that the following descriptions of the embodiments are provided for illustration only and not for the purpose of limiting the invention as defined by the appended claims and their equivalents.

Figure 1:
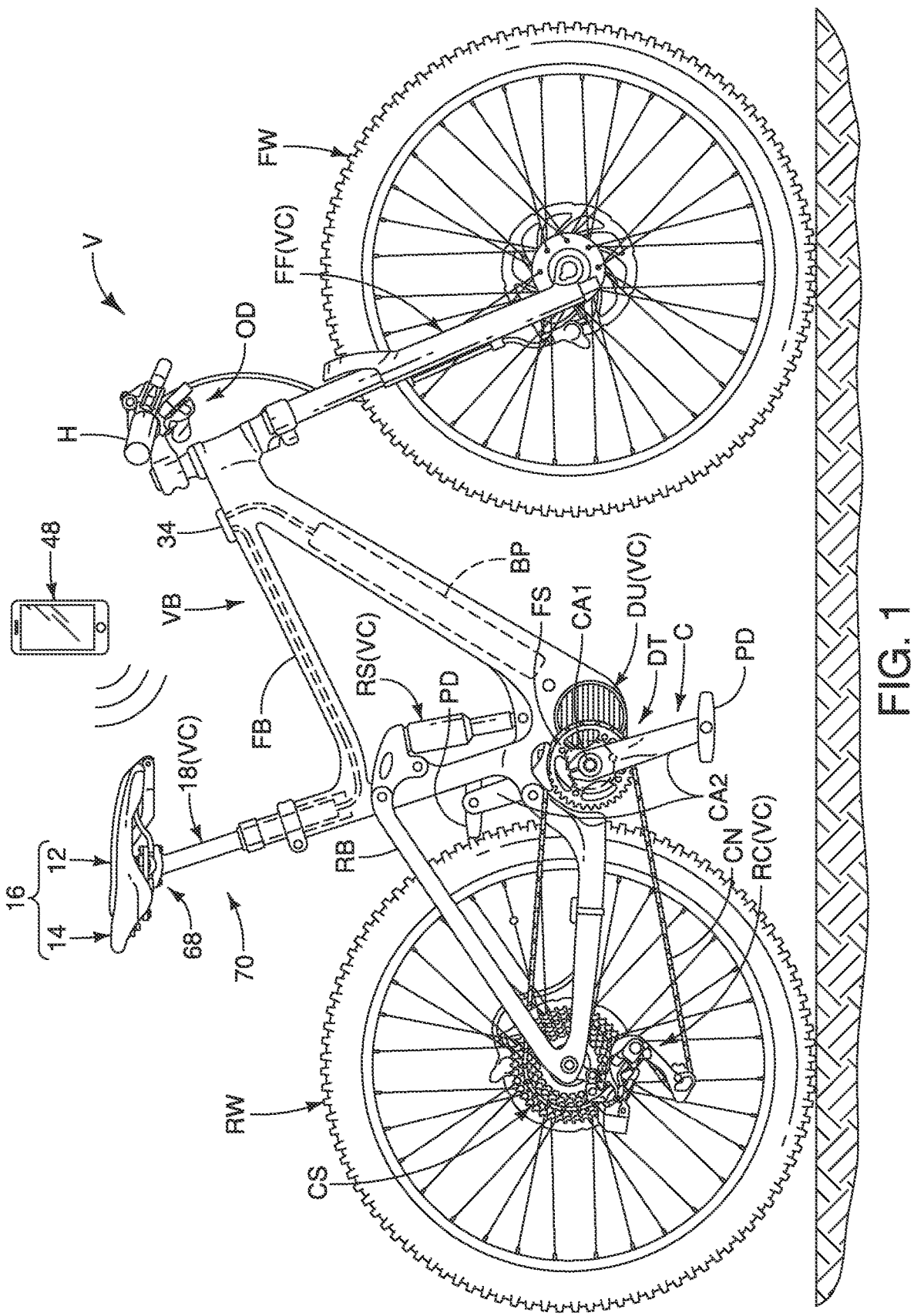
FIG. 1 is a side elevational view of a human powered vehicle (e.g., a bicycle) that is equipped with a human-powered vehicle control system having a saddle assembly comprising a saddle sensor assembly in accordance with a first embodiment.

Referring initially to FIG. 1, a human-powered vehicle control system 10 is provided for a human-powered vehicle V in accordance with a first embodiment. The human-powered vehicle control system 10 comprises a saddle sensor assembly 12. As explained below, the human-powered vehicle control system 10 is configured to control a vehicle component based a rider's condition using the saddle sensor assembly 12. The saddle sensor assembly 12 is provided to a saddle 14. Thus, a saddle assembly 16 comprises the saddle 14 and the saddle sensor assembly 12. Alternatively, the saddle sensor assembly 12 can be attached to a seatpost 18. Here, in the first embodiment, the saddle sensor assembly 12 is attached to the saddle 14. The saddle 14 is attached to the seatpost 18, which is a height adjustable seatpost in the first embodiment.

While the human-powered vehicle V is illustrated as a bicycle having two wheels in FIG. 1, the number of wheels on the human-powered vehicle V is not limited. The human-powered vehicle V includes, for example, a monocycle and a vehicle including three or more wheels. The human-powered vehicle V is not limited to a vehicle configured to be driven only by a human driving force. The human-powered vehicle V includes an E-bike that uses driving force of a motor in addition to the human driving force for propulsion. The E-bike includes an electric assist bicycle that assists in propulsion with a motor. In the embodiments described below, the human-powered vehicle V refers to an electric assist bicycle. However, the bicycle component control system 10 can be applied to any other type of bicycles such as, for example, a road bike, a mountain bike, a cyclocross bicycle, a gravel bike, a city bike, a cargo bike, and a recumbent bike.

As shown in FIG. 1, the human-powered vehicle V includes a vehicle body VB that is supported by a rear wheel RW and a front wheel FW. The vehicle body VB basically includes a front frame body FB and a rear frame body RB. Here, the rear frame body RB is a swing arm that is pivotally coupled to the front frame body FB. The vehicle body VB is also provided with a handlebar H. A front suspension fork FF is pivotally coupled at its upper end to the vehicle body VB, and rotatably supports the front wheel FW at its lower end. The handlebar H is mounted to the upper end of front suspension fork FF for steering the front wheel FW. Front suspension fork FF absorbs shock transmitted from the front wheel FW. The rear frame body RB is swingably mounted to a rear section of the front frame body FB such that the rear frame body RB can pivot with respect to the front frame body FB. The rear wheel RW is rotatably mounted to a rear end of the rear frame body RB. A rear shock absorber RS is operatively disposed between the front frame body FB and rear frame body RB. The rear shock absorber RS is provided between the front frame body FB and the rear frame body RB to control the movement of the rear frame body RB with respect to the front frame body FB. Namely, the rear shock absorber RS absorbs shock transmitted from the rear wheel RW. The seatpost 18 is mounted to a seat tube of the vehicle body VB in a conventional manner and supports a bicycle seat or saddle 14 in any suitable manner.

The human-powered vehicle V has a drivetrain DT. In the illustrated embodiment, the drivetrain DT includes a drive unit DU that provides driving force of a motor in addition to the human driving force for propulsion. The drive unit DU is an electric assist motor. Here, for example, the drivetrain DT is a chain-drive type. Thus, the drivetrain includes a chain CN. The drivetrain DT further includes a crank C, a front sprocket assembly FS and a rear sprocket assembly CS. The crank C includes a crank axle CA1 and a pair of crank arms CA2. The crank axle CA1 is rotatably supported to the vehicle body VB in a conventional manner. The crank arms CA2 are provided on opposite ends of the crank axle CAL A pedal PD is rotatably coupled to the distal end of each of the crank arms CA2.

Figure 9:
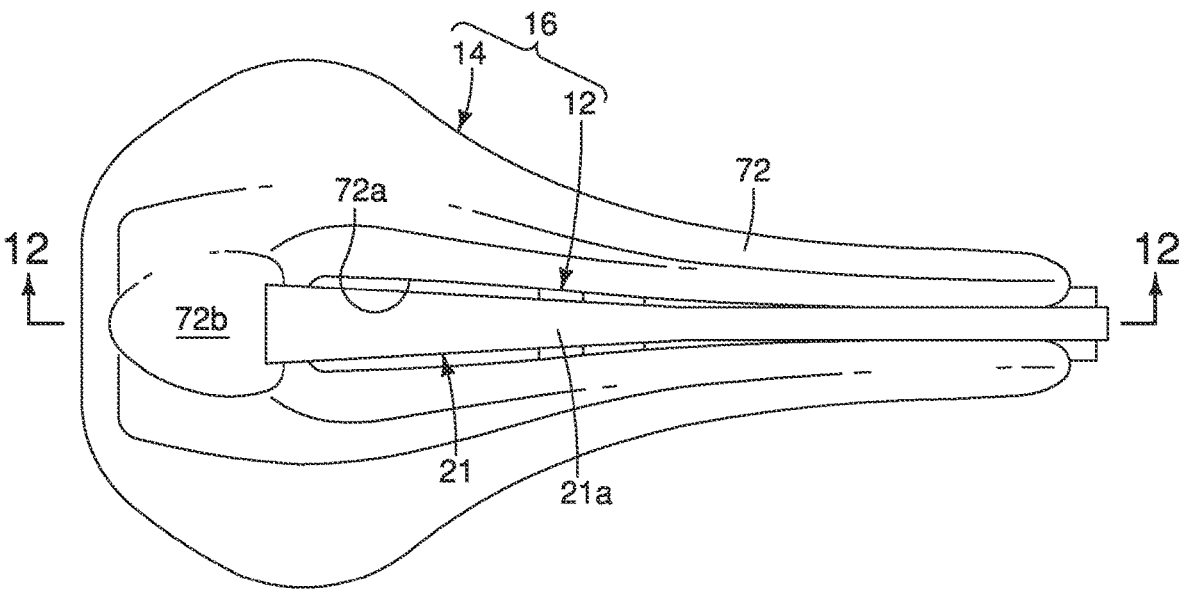
FIG. 9 is a top plan view of the saddle assembly illustrated in FIGS. 6 to 8.
Figure 10:
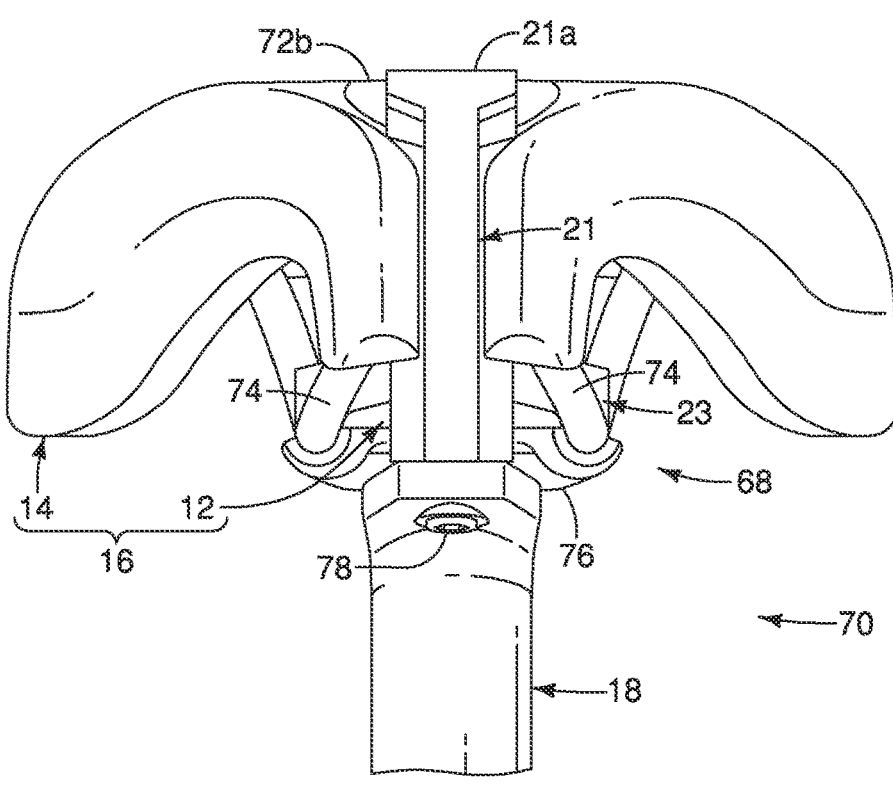
FIG. 10 is a front elevational view of the saddle assembly illustrated in FIGS. 6 to 9.
Figure 11:
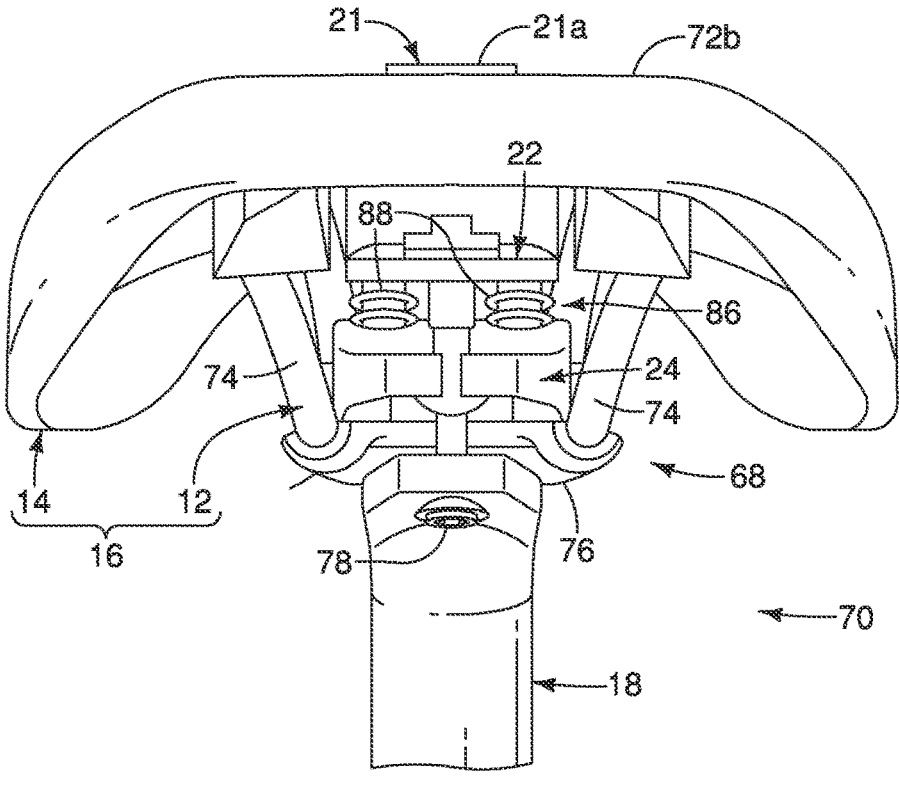
FIG. 11 is a rear elevational view of the saddle assembly illustrated in FIGS. 6 to 10.

In the case of the human-powered vehicle V, as seen in FIGS. 1 and 9, the front sprocket assembly FS includes a single chainring. The front sprocket assembly FS is provided on the crank C to rotate integrally with the crank axle CAL The rear sprocket assembly CS is provided on a hub of the rear wheel RW. The rear sprocket assembly CS includes a plurality of rear sprockets. A human driving force is applied to the pedals PD by a rider such that the driving force is transmitted via the front sprocket assembly FS, the chain CN and the rear sprocket assembly CS to the rear wheel RW.

Also, the human-powered vehicle V has at least one operating device OD for a rider to change a transmission ratio of the drivetrain DT. Here, the human-powered vehicle V includes a rear derailleur RD as transmission device. The rear derailleur RD is configured to be manually operated in response to operation of the operating device OD. The rear derailleur RD is configured to change the transmission ratio of the drivetrain DT. The rear derailleur RD is configured to shift the chain CN between the sprockets of the rear sprocket assembly CS to change the transmission ratio of the rotational speed of the rear wheel RW to the rotational speed of the crank axle CAL The human-powered vehicle V can also be provided with a front derailleur if needed and/or desired. In such a case, the transmission ratio of the drivetrain DT can be changed by operating the rear derailleur RD and/or the front derailleur.

Figure 2:
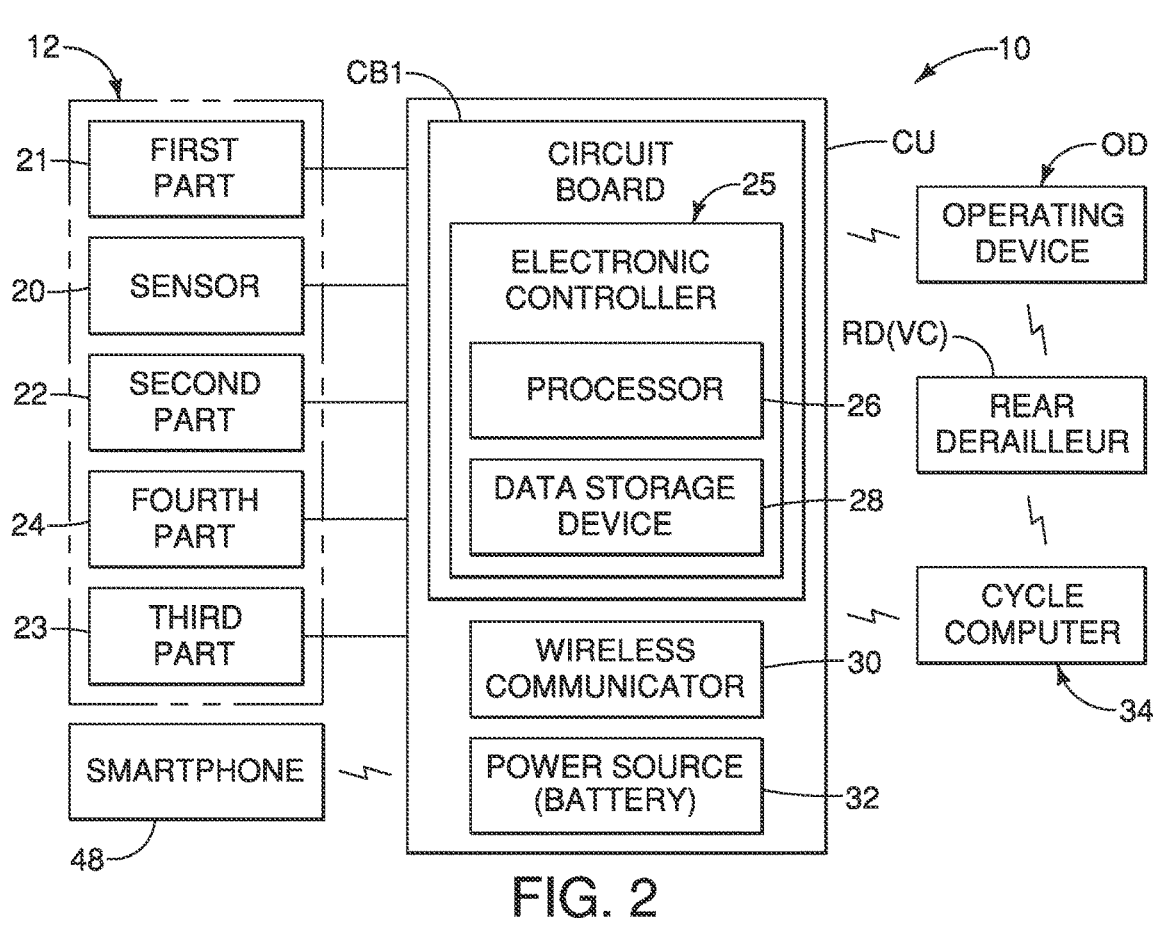
FIG. 2 is a schematic block diagram of the basic components of the human-powered vehicle control system having the saddle assembly comprising the saddle sensor assembly.

As seen in FIG. 2, the basic components of the human-powered vehicle control system 10 are illustrated using a schematic block diagram. As mentioned above, the human-powered vehicle control system 10 includes the saddle sensor assembly 12. The saddle sensor assembly 12 comprises a sensor 20, a first part 21, a second part 22 and a third part 23. Basically, the sensor 20 is provided to one of the first part 21 and the second part 22. Here, as seen in FIGS. 6 to 13, the first part 21 functions as a load input, and the second part 22 functions as a sensor support. The third part 23 supports the first part 21 and the second part 22. Also, the third part 23 is configured to be attached to at least one of the saddle 14 and the seatpost 18. Thus, the third part functions as a seatpost mount or clamp member of the seatpost 18.

Accordingly, the sensor 20 is configured to detect a rider's condition based on a relative movement of at least one of the first part 21 and the second part 22 as explained later. Thus, the first part 21 is movably connected to the second part 22. In particular, the first part 21 is configured to be movable relative to the second part 22 between a first position and a second position. In the illustrated embodiment, the sensor 20 is configured to detect relative movement of at least one of the first part 21 and the second part 22 between the first position and the second position. In this way, the sensor 20 detects a rider's condition. Basically, in the first embodiment, the first position corresponds to a non-loaded position in which the rider is not contacting the first part 21. In other words, in the first position, the rider is not sitting on the saddle 14. Also, in the first embodiment, the second position corresponds to a loaded position in which the rider is contacting the first part 21 and the first part 21 is moved from the first position relative to the second part 22. In other words, in the second position, the rider is sitting on the saddle 14. The sensor 20, the first part 21 and the second part 22 will be discussed in further detail later. Also, as explained later, the saddle sensor assembly 12 further comprises a fourth part 24 that adjustably connects the second part 22 in a longitudinal direction of the saddle 14. Thus, the fourth part 24 functions as a longitudinal adjuster.

The human-powered vehicle control system 10 further comprises a controller 25. The controller 25 is configured to receive a signal from the saddle sensor assembly 12. Based on the signal from the saddle sensor assembly 12, the controller 25 is configured to determine a rider's condition. In particular, the controller 25 is configured to receive a signal from the sensor 20, and is configured to determine a rider's condition. Here, the saddle 14 is provided with a control unit CU that housing the controller 25. The controller 25 is electrically connected to the sensor 20 by an electrical wire W. While the control unit CU is mounted to the fourth part 24 in the first embodiment, the control unit CU can be mounted at another location such as other parts of the saddle sensor assembly 12, the saddle 14, the seatpost 18 or the vehicle body VB. Alternatively, the control unit CU can be provided in the saddle sensor assembly 12 so that the sensed signal is processed locally, which enables higher data transmission efficiency. Alternatively, the control unit CU can be provided in the drive unit DU, and preferably integrated with the electronic controller of the drive unit DU. Generally, here, the control unit CU provides electric power to the sensor 20 and wirelessly communicates with one or more of the human-powered vehicle component VC.

In the first embodiment, the rider's condition includes a rider's posture. Also, in the first embodiment, the rider's condition includes an estimation of a rider's fatigue. Here, the sensor 20 of the saddle sensor assembly 12 detects whether a rider is sitting on the saddle 14. Thus, the rider's posture includes at least one of sitting and standing. Moreover, the controller 25 can estimate a rider's fatigue based on the rider's contact (e.g., length of time of contact, a frequency of contact, etc.) with the saddle 14 using the saddle sensor assembly 12, and using other sensors (e.g., an inclination sensor, a cadence sensor, a velocity sensor, an acceleration sensor, etc.) as needed and/or desired.

The human-powered vehicle control system 10 further comprises a human-powered vehicle component VC that is configured to receive commands from the controller 25 to perform a predetermined action according to the rider's condition. In the human-powered vehicle V illustrated in FIG. 1, the rear derailleur RD, the adjustable seatpost 18, the rear shock absorber RS, the front fork FF, and the drive unit DU are all examples of human-powered vehicle components VC that are configured to receive commands from the controller 25 to perform a predetermined action according to the rider's condition.

The controller 25 includes one or more processors 26 that executes predetermined control programs. The processor 26 of the controller 25 includes, for example, a central processing unit (CPU) or a micro processing unit (MPU). Here, the processor 26 is provided on a circuit board CB1. While only one processor is illustrated in FIG. 2, it will be apparent from this disclosure that several processors can be used. Thus, the controller 25 can include processors provided at positions separate from each other. In a case where the processors are provided at positions separate from each other, the processors are connected so as to communicate with each other via a wireless communication device. The controller 25 can include one or more microcomputers. Thus, the terms "controller" and "electronic controller" as used herein refer to hardware that executes a software program, and does not include a human being.

The human-powered vehicle control system 10 further comprises a data storage device 28 electrically connected to the controller 25. Here, the data storage device 28 is provided on the circuit board CB1 and can be considered as a part of the controller 25. Alternatively, the data storage device 28 can be a separate part from the controller 25. The data storage device 28 stores control programs and information used for a control process. In particular, for example, the data storage device 28 is configured to store a reference value to determine the rider's condition. The data storage device 28 includes any computer storage device or any non-transitory computer-readable medium with the sole exception of a transitory, propagating signal. For example, the data storage device 28 includes a nonvolatile memory and a volatile memory. The nonvolatile memory includes, for example, at least one of a read-only memory (ROM), an erasable programmable read only memory (EPROM), an electrically erasable programmable read-only memory (EEPROM), and a flash memory. The volatile memory includes, for example, a random access memory (RAM).

The human-powered vehicle control system 10 further comprises a wireless communicator 30 electrically connected to the controller 25. The term "wireless communicator" includes a receiver, a transmitter, a transceiver, a transmitter-receiver, and contemplates any device or devices, separate or combined, capable of transmitting and/or receiving wireless communication signals, including shift signals or control, command or other signals related to some function of the component being controlled. The wireless communication signals can be radio frequency (RF) signals, ultra-wide band communication signals, radio frequency identification (RFID), ANT+ communications, or Bluetooth® communications or any other type of signal suitable for short range wireless communications as understood in the human-powered vehicle field.

Here, the wireless communicator 30 is housed in the control unit CU that is provided to the saddle 14. The wireless communicator 30 is configured to wirelessly transmit the rider's condition from the controller 25. In other words, the wireless communicator 30 is configured to wirelessly transmit a control signal to control at least one of the human-powered vehicle components VC based on the rider's condition. In this case, the wireless communicator 30 includes a transmitter. Additionally, here, the wireless communicator 30 is configured to wirelessly receive commands for the controller 25. In this case, the wireless communicator 30 includes a receiver. Thus, in the first embodiment, the wireless communicator 30 is a two-way wireless communicator that includes a transmitter and a receiver, or a transceiver. Alternatively, the controller 25 can communicate with at least one of the human-powered vehicle components VC using a wire. For example, power line communication (PLC), controller area network (CAN), or universal asynchronous receiver/transmitter (UART) can be used to communicate with at least one of the human-powered vehicle components VC. The wireless communicator 30 is electrically connected to the controller 25. Here, the wireless communicator 30 is diagrammatically illustrated as being separate from the circuit board CB1 of the controller 25. Alternatively, the wireless communicator 30 can be provided on the circuit board CB1 of the controller 25.

The wireless communicator 30 can directly communicate with at least one of the human-powered vehicle components VC including, but not limited to, the rear derailleur RD, the adjustable seatpost 18, the rear shock absorber RS, the front fork FF, and the drive unit DU. Alternatively, the wireless communicator 30 can indirectly communicate with at least one of the human-powered vehicle components VC via another component.

As seen in FIG. 2, the human-powered vehicle control system 10 further comprises a power source 32 that is configured to supply electric power to the human-powered control system 10. Here, the power source 32 is a battery disposed in the control unit CU that is provided to the saddle 14. Alternately, the power source 32 can be replaced or used in conjunction with a power source such as a capacitor, a fuel cell, a solar powered cell, or any other electric power source. The power source 32 is electrically connected to the controller 25 and the wireless communicator 30 to provide electric power to the controller 25 and the wireless communicator 30. Here, the power source 32 is diagrammatically illustrated as being provided in the control unit CU. Alternatively, the power source 32 can be provided in the saddle sensor assembly 12, in such a manner as button cells, to supply power to the sensor 20. Alternatively, the power source 32 can be a battery pack BP integrated in the front frame body FB, which mainly supplies power to the motor in the drive unit DU. Alternatively, the power source 32 can be a generator such as a dynamo.

As seen in FIG. 2, the human-powered vehicle control system 10 further comprises a cycle computer 34 that functions as a notification device for notifying a rider of at least one of the rider's condition and the status of one or more of the human-powered vehicle components VC. Preferably, the cycle computer 34 is configured to wirelessly communicate with the controller 25. Here, the cycle computer 34 includes an electronic controller 36, a wireless communicator 38 and a power source 40.

Figure 3:
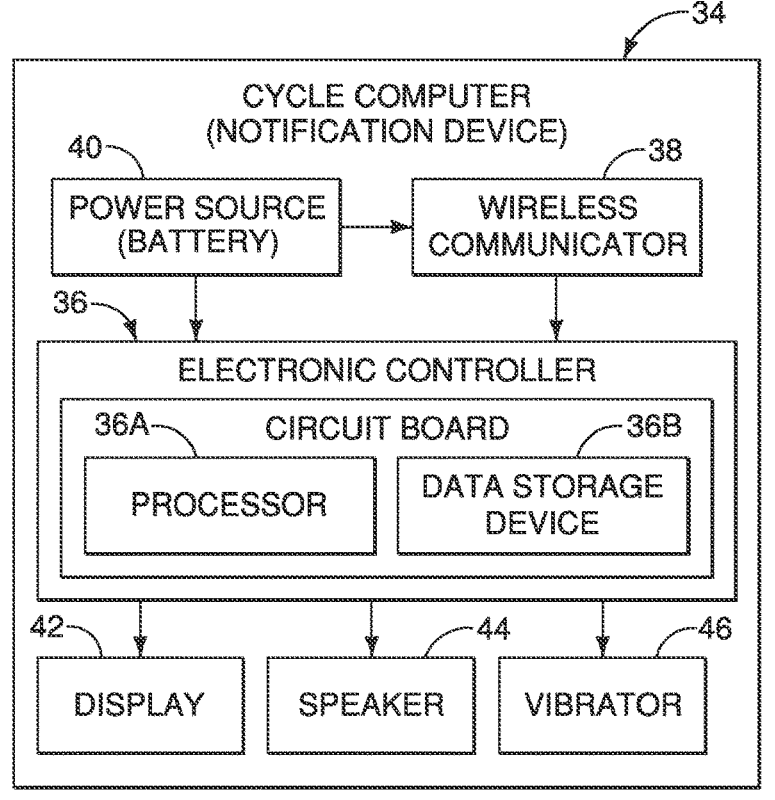
FIG. 3 is a schematic block diagram of a notification device of the human-powered vehicle control system.

As seen in FIG. 3, the electronic controller 36 includes one or more processors 36A that executes predetermined control programs. The processor 36A of the electronic controller 36 includes, for example, a central processing unit (CPU) or a micro processing unit (MPU). Here, the processor 36A is provided on a circuit board CB2. The electronic controller 36 further comprises a data storage device 36B electrically connected to the electronic controller 36. The data storage device 36B stores control programs and information used for a control process. The data storage device 36B includes any computer storage device or any non-transitory computer-readable medium with the sole exception of a transitory, propagating signal. For example, the data storage device 36B includes a nonvolatile memory and a volatile memory. The nonvolatile memory includes, for example, at least one of a read-only memory (ROM), an erasable programmable read only memory (EPROM), an electrically erasable programmable read-only memory (EEPROM), and a flash memory. The volatile memory includes, for example, a random access memory (RAM).

The wireless communicator 38 is configured to wirelessly receive the rider's condition from the wireless communicator 30 of the controller 25. In other words, the wireless communicator 38 is configured to wirelessly receive a control signal to control at least one of the human-powered vehicle components VC based on the rider's condition. In this case, the wireless communicator 30 includes a receiver. Additionally, here, the wireless communicator 38 is configured to wirelessly transmit commands for the electronic controller 36. In this case, the wireless communicator 30 includes a transmitter. Thus, in the first embodiment, the wireless communicator 38 is a two-way wireless communicator that includes a transmitter and a receiver, or a transceiver. Alternatively, the electronic controller 36 can communicate with at least one of the human-powered vehicle components VC using a wire. For example, power line communication (PLC), controller area network (CAN), or universal asynchronous receiver/transmitter (UART) can be used to communicate with the controller 25 and at least one of the human-powered vehicle components VC.

The human-powered vehicle control system 10 further comprises a display device (a cycle computer 34) that is configured to receive information from the controller 25, and is configured to display the rider's condition. Alternatively, the information from the controller 25 can be conveyed to a rider using a speaker 44 or a haptic device such as a vibrator 46. In the first embodiment, the display 42, the speaker 44 and the vibrator 46 are integrated into the cycle computer 34. Alternatively, the display device 42, the speaker 44 and the vibrator 46 can be integrated into other devices such as a smartphone 48, a tablet or a personal computer.

Figures 4, 5:
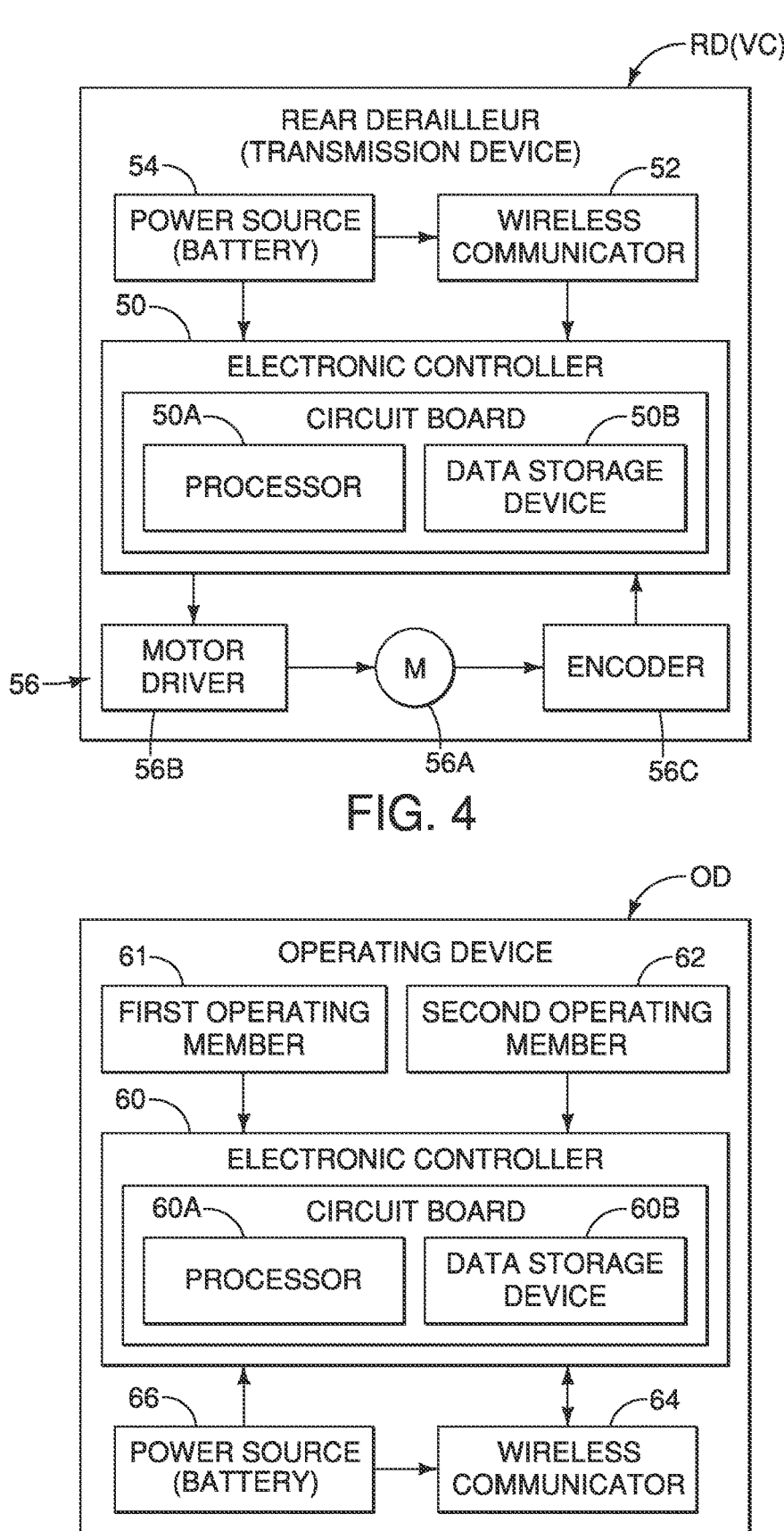
FIG. 4 is a schematic block diagram of a transmission device of the human-powered vehicle control system.
FIG. 5 is a schematic block diagram of an operating device of the human-powered vehicle control system.

Referring now to FIG. 4, the basic components of the rear derailleur RD are illustrated using a schematic block diagram. As mentioned above, the rear derailleur RD is one example of a vehicle component VC that is controlled based on detection results of the saddle sensor assembly 12. The rear derailleur RD is an electric rear derailleur that is manually controlled by the operating device OD, or automatically controlled by a control signal produced by the control unit CU.

Since rear derailleurs such as the rear derailleur RD are well known, the rear derailleur RD will only be briefly described herein. The rear derailleur RD includes an electronic controller 50, a wireless communicator 52, a power source 54 and an actuator 56. The electronic controller 50 that is configured to control the actuator 56 in response to shift commands received from the operating device OD. The electronic controller 50 includes at least one processor 50A. The at least one processor 50A can be for example, a central processing unit (CPU) or a micro processing unit (MPU). The processor 50A includes, for example, an arithmetic processing unit. Here, the electronic controller 50 includes a data storage device 50B. The data storage device 50B stores various control programs and information used for various control processes. Here, the data storage device 50B contains a total tooth number of the front sprocket assembly FS and a total tooth number of each gear of the rear sprocket assembly CS. The data storage device 50B includes any computer storage device or any non-transitory computer-readable medium with the sole exception of a transitory, propagating signal.

The wireless communicator 52 is preferably a wireless transceiver, which is one example of a two-way wireless communicator. The wireless communicator 52 is configured to receive shift commands from the operating device OD. The shift commands are wireless communication signals. The wireless communicator 52 is configured to transmit wireless communication signals containing shifting information to the cycle computer 34 and/or the smartphone 48. The wireless communication signals can be radio frequency (RF) signals, ultra-wide band communication signals, radio frequency identification (RFID), ANT+ communications, or Bluetooth® communications or any other type of signal suitable for short range wireless communications as understood in the human-powered vehicle field. Thus, the wireless communicator 52 constitutes one example of a communication device. Alternatively, the rear derailleur RD can be configured to communicate with the operating device OD and the cycle computer 34 by a dedicated signal wire or by a power wire using power line communication (PLC).

Here, the power source 54 is a battery removable provided on a base member of the rear derailleur RD. Preferably, the power source 54 is a rechargeable battery that can be removed to be charged, and then reattached to the base member of the rear derailleur RD. Alternately, the power source 54 can be replaced or used in conjunction with a power source such as a capacitor, a fuel cell, a solar powered cell, or any other electric power source. The power source 54 is electrically connected to the electronic controller 50 to provide electric power to the electronic controller 50.

Here, the actuator 56 includes a reversible electric motor 56A that is provided on the base member of the rear derailleur RD. The actuator 56 also includes a motor driver 56B and an encoder 56C. The electric motor 56A is operatively coupled to a linkage of the rear derailleur RD for moving a pulley assembly of the rear derailleur RD between a plurality of sprocket positions.

Referring now to FIG. 5, the basic components of the operating device OD are illustrated using a schematic block diagram. The operating device OD is configured to shift the rear derailleur RD for changing a transmission ratio of the drivetrain DT. Thus, the operating device OD provides manual shifting of the rear derailleur RD. Here, the operating device OD is configured to wirelessly communicate with the rear derailleur RD. Alternatively, the operating device OD can be configured to communicate with the rear derailleur RD by a dedicated signal wire or by a power wire using power line communication (PLC).

Basically, the operating device OD is an electric shifter that is configured to be mounted to the handlebar H by a handlebar clamp in a conventional manner. The operating device 12 includes an electronic controller 60, a first operating member 61 and a second operating member 62.

The electronic controller 60 includes at least one processor 60A and a data storage device 60B. The at least one processor 60A can be for example, a central processing unit (CPU) or a micro processing unit (MPU). The processor 60A includes, for example, an arithmetic processing unit. The data storage device 60B stores various control programs and information used for various control processes. The data storage device 60B includes any computer storage device or any non-transitory computer-readable medium with the sole exception of a transitory, propagating signal.

A first electrical switch is depressed in response to operation of the first operating member 61 by a rider. A second electrical switch is depressed in response to operation of the second operating member 62 by a rider. The electronic controller 60 receives an electrical signal from the first electrical switch in response to the operation of the first operating member 61 and an electrical signal from the second electrical switch in response to the operation of the second operating member 62. The rider selectively operates the first operating member 61 and the second operating member 62 to output a shift command or signal to the rear derailleur RD. The shift command or signal includes an upshift command or signal and/or a downshift command or signal.

Here, the operating device OD includes a wireless communicator 64. Here, the wireless communicator 64 is preferably a wireless transmitter so that the wireless communicator 64 can transmit shift commands to the rear derailleur RD as well as any other component as needed and/or desired. The wireless transmitter is one example of a one-way wireless communication device that can transmit shift commands as wireless communication signals. The wireless communication signals can be radio frequency (RF) signals, ultra-wide band communication signals, radio frequency identification (RFID), ANT+ communications, or Bluetooth® communications or any other type of signal suitable for short range wireless communications as understood in the human-powered vehicle field.

Here, the operating device OD further includes a power source 66. Here, the power source 66 is a battery. Preferably, the power source 66 is either a replaceable button battery or a rechargeable battery. Alternately, the power source 66 can be replaced or used in conjunction with a power source such as a capacitor, a fuel cell, a solar powered cell, or any other electric power source. The power source 66 is electrically connected to the electronic controller 60 to provide electric power to the electronic controller 60.

Figure 6:
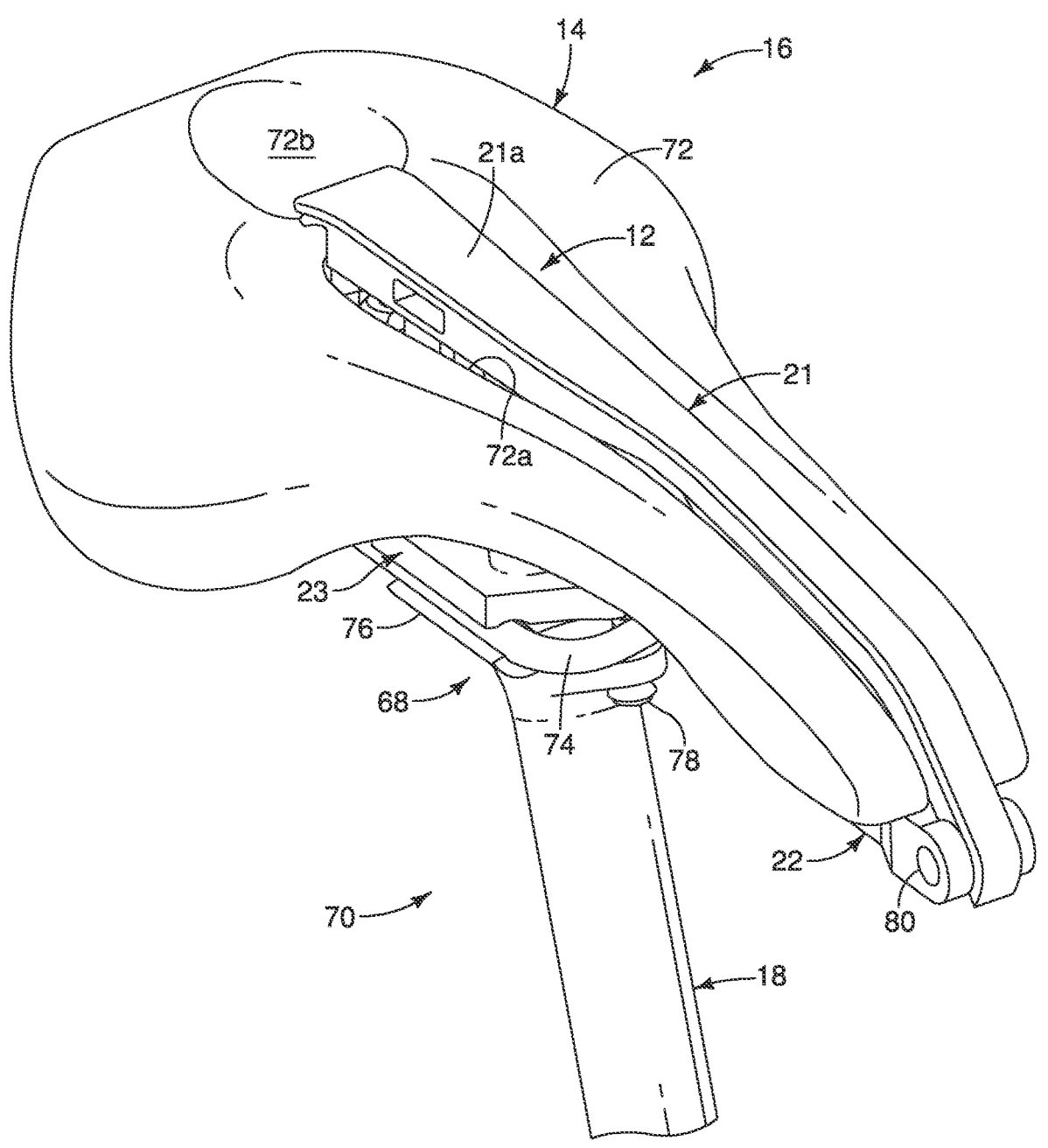
FIG. 6 is a perspective view of the saddle assembly illustrated in FIG. 1 comprising the saddle sensor assembly in which the saddle assembly is coupled to a seatpost.
Figure 7:
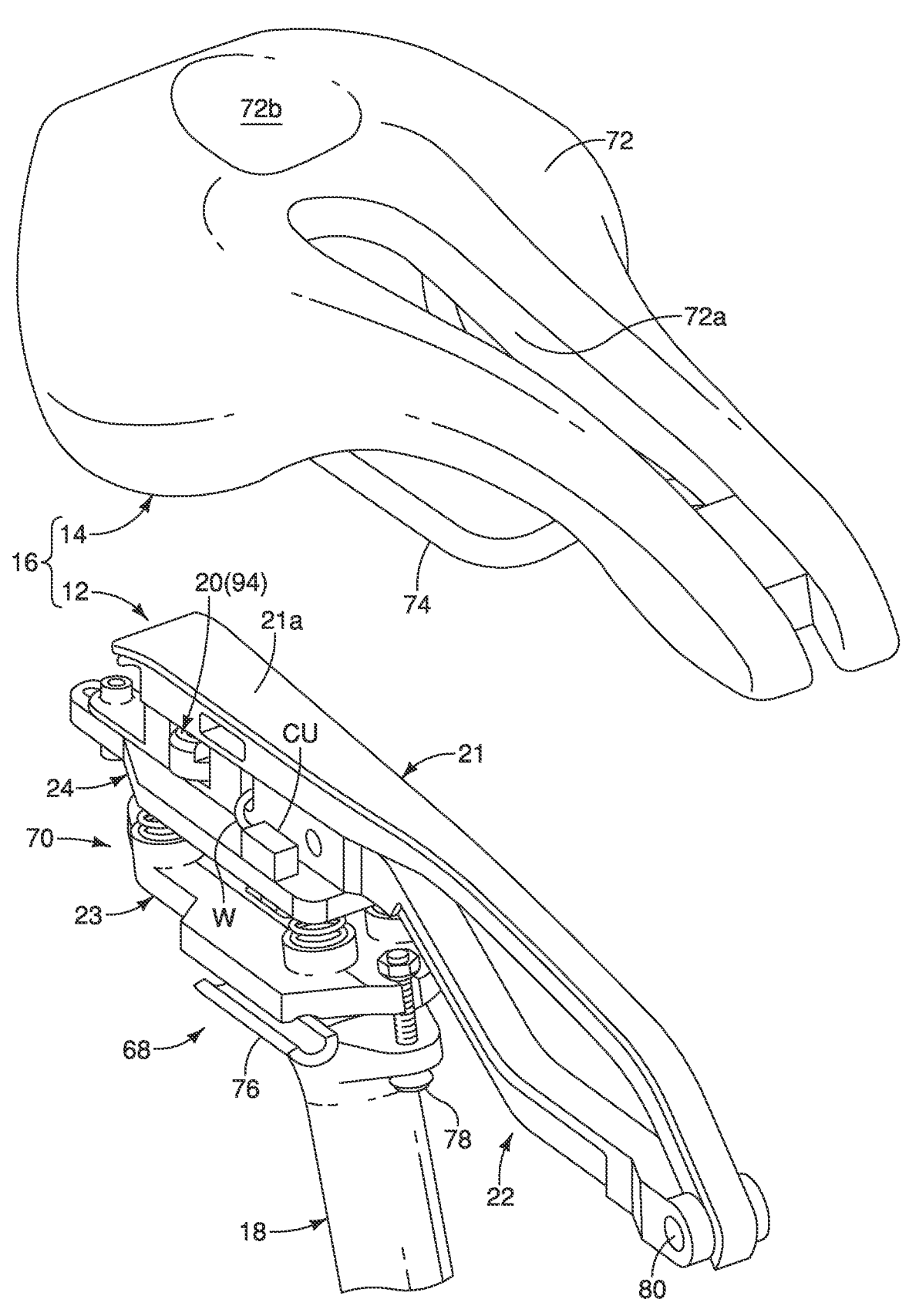
FIG. 7 is a partially exploded perspective view of the saddle assembly illustrated in FIG. 6.
Figure 8:
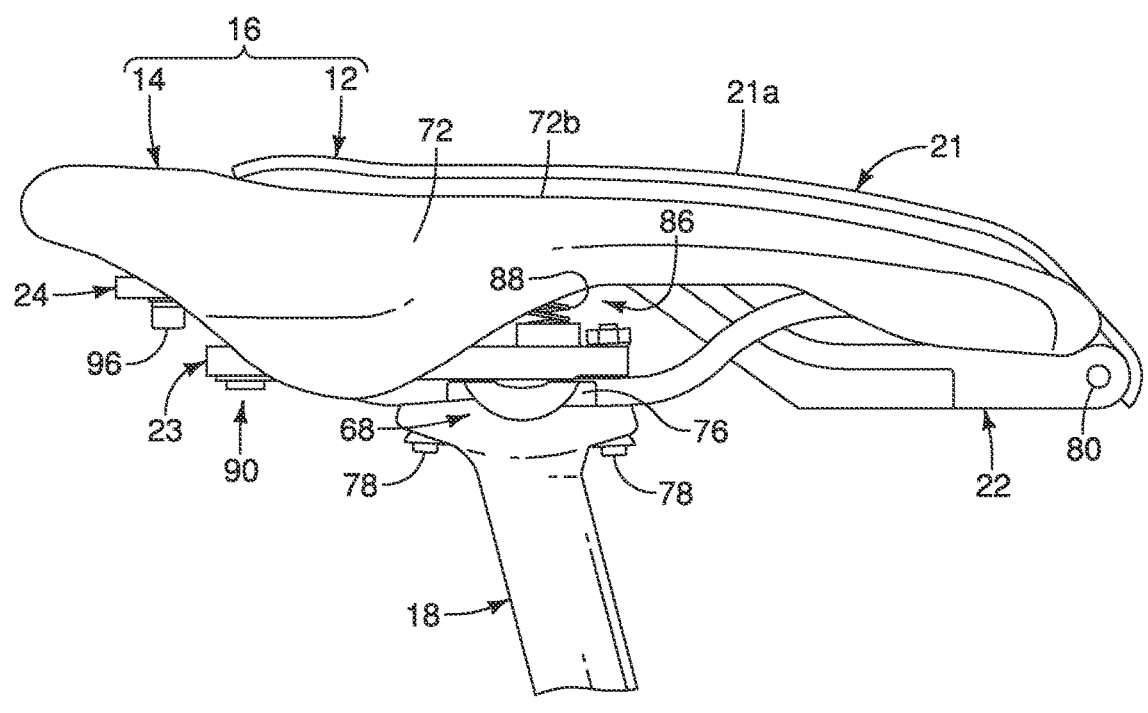
FIG. 8 is a side elevational view of the saddle assembly illustrated in FIGS. 6 and 7.

Referring now to FIGS. 6 to 17, the saddle sensor assembly 12, the saddle 14 and the seatpost 18 will now be discussed in more detail. In the illustrated embodiment, the saddle sensor assembly 12 is detachably integrated with the saddle 14 to form the saddle assembly 16 that is mounted to the seatpost 18. As seen in FIGS. 6 to 8, in the illustrated embodiment, the saddle sensor assembly 12 is attached to both the saddle 14 and the seatpost 18. In particular, the saddle sensor assembly 12 integrated with a saddle clamp 68 of the seatpost 18. Thus, as seen in FIG. 7, a seatpost assembly 70 comprises a seatpost 18 and the saddle sensor assembly 12, which is attached to the seatpost 18.

In particular, the saddle 14 basically comprises a seat portion 72 and a pair of saddle rails 74. The seat portion 72 of the saddle 14 has an opening 72a for receiving the saddle sensor assembly 12. In this way the first part 21 can protrude above a seat surface 72b of the seat portion 72 of the saddle 14 as seen in FIGS. 6 and 8. The saddle rails 74 are fixed to the seat portion 72, and are configured to be coupled to the seatpost 18 by the saddle clamp 68. Preferably, the third part 23 is integrated with the saddle clamp 68 of the seatpost 18. In particular, the saddle clamp 68 includes a first clamp member 76, the third part 23 of the saddle sensor assembly 12 as a second clamp member, and a pair of clamp bolts 78. Thus, the third part 23 is configured to be attached to the saddle rails 14B of the saddle 14. More specifically, the saddle rails 74 are clamped between the first clamp member 76 and the third part 23 and secured to the seatpost 18 by the clamp bolts 78. In this way, the third part 23 is attached to the saddle 14, and the third part 23 is attached to the seatpost 18.

In the illustrated embodiment, the first part 21 is pivotally connected to the second part 22. In particular, a pivot pin 80 pivotally connects a front end of the first part 21 to a front end of the second part 22. In this way, the first part 21 is movably relative to the second part 22. The pivot pin 80 forms a first connection between the first part 21 and the second part 22. Thus, the first part 21 is movably connected to the second part 22 by the first connection (the pivot pin 80). Here, the first connection (the pivot pin 80) is located near a front end of the saddle 14 where the saddle sensor assembly 12 is attached to the saddle 14.

Preferably, the second part 22 is provided closer to the seatpost 18 than the first part 21. As seen in FIGS. 6 and 8, the first part 21 has an upper surface 21a configured to be positioned above the seat surface 72b of the saddle 14 in a case where the saddle sensor assembly 12 is attached. Thus, the first part 21 is configured to receive a load from a rider. Here, the upper surface 21a curves down toward a front of the saddle 14 where the saddle sensor assembly 16 is mounted to the saddle 14. Since the first part 21 is pivotally connected to the second part 22, the first part moves relative to the second part 22 when a rider sits on the saddle 14. In this way, the first part 21 functions as a load input member that receives a load from a rider when a rider sits on the saddle 14. Thus, the first part 21 is configured to be movable due to the load applied by the rider.

Figure 13:
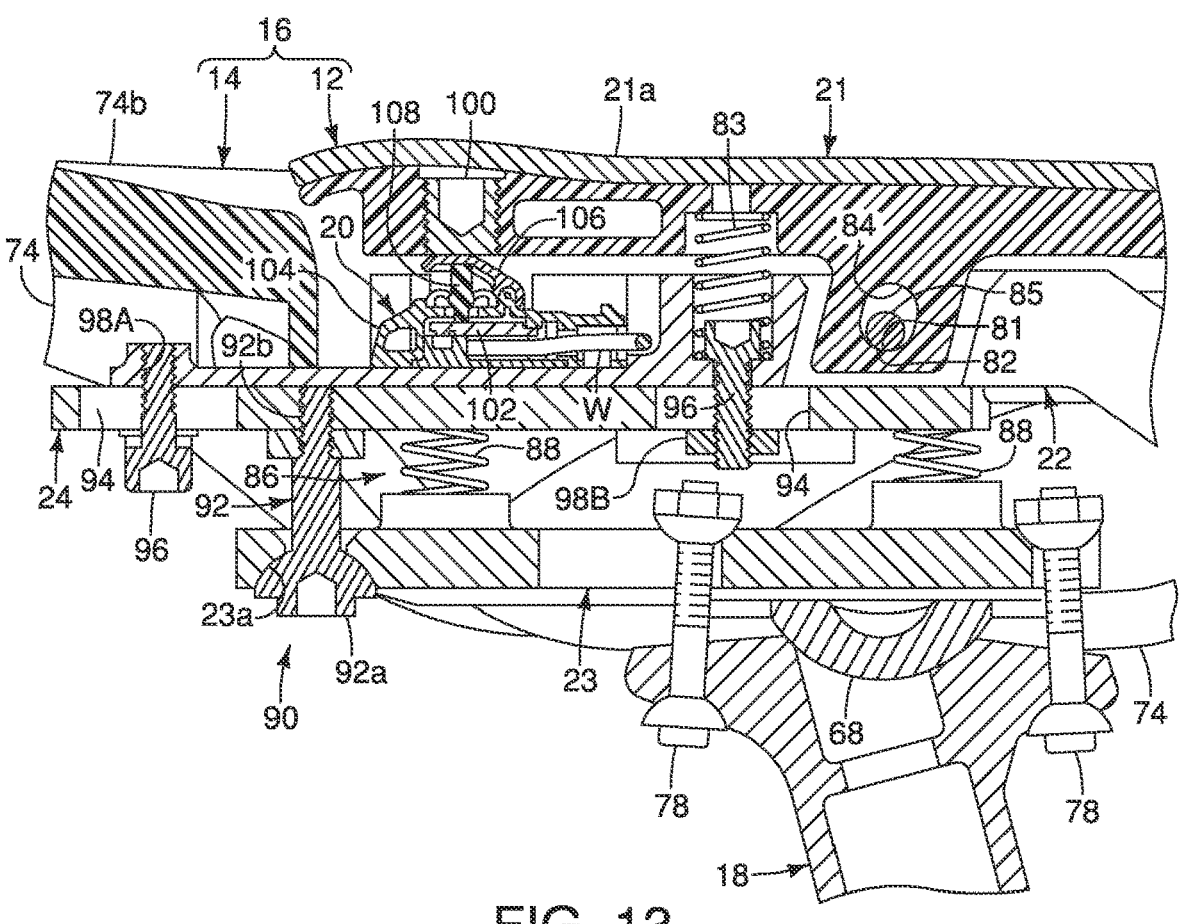
FIG. 13 an enlarged partial cross sectional view of a portion of the saddle assembly illustrated in FIG. 12.
Figure 14:
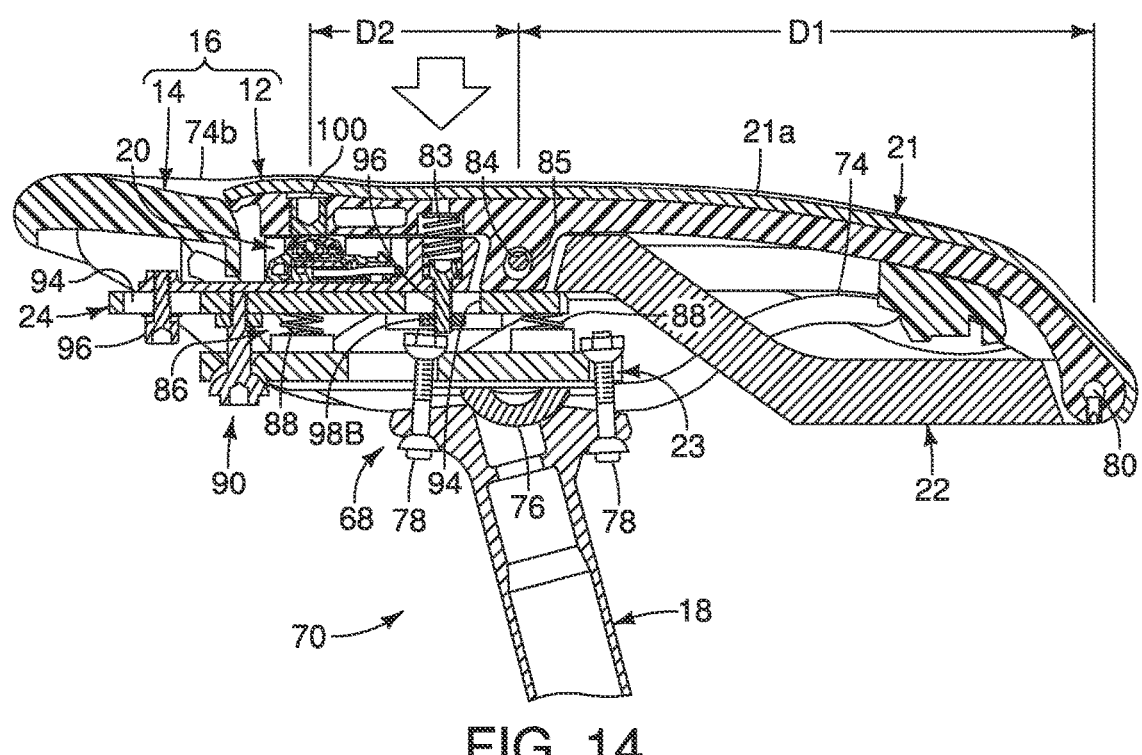
FIG. 14 is a cross sectional view, similar to FIG. 12, of the saddle assembly illustrated in FIGS. 6 to 11, but in which the saddle has been moved to depress the sensor.
Figure 15:
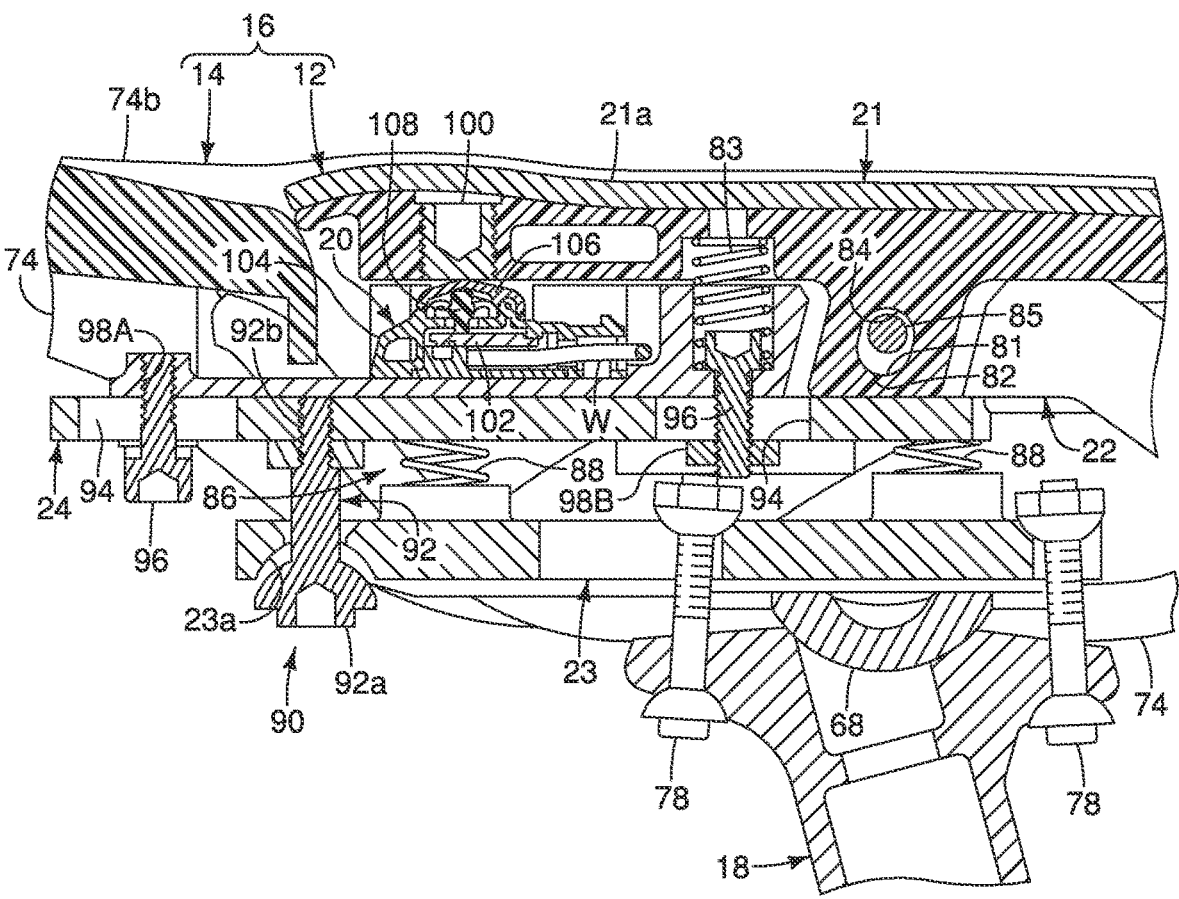
FIG. 15 is an enlarged partial cross sectional view of a portion of the saddle assembly illustrated in FIG. 14.

Preferably, as seen in FIGS. 13 and 15, the first part 21 is connected to the second part 22 by a second connection that includes a first abutment 81, a second abutment 82 and a biasing element 83. The second connection is located near a middle of the saddle 14 where the saddle sensor assembly 16 is mounted to the saddle 14. Here, the first abutment 81 is formed by an elongated opening 84 that is provided to the first part 21, while the second abutment 82 is formed by a pin 85 that is provided to the second part 22. The biasing element 83 is disposed between to the first part 21 and the second part 22 to urge the first abutment 81 into contact with the second abutment 82. In this way, the first part 21 is biased away from the second part 22 by the biasing element 83 about the pivot pin 80, while still permitting the first part 21 to pivot towards the second part 22 against the urging force of the biasing element 83. Here, the biasing element 83 is a coiled compression spring. Alternatively, other types of springs or elastic bodies can be used in addition to or instead of a coiled compression spring. With this arrangement the first part 21 is connected to the second part 22 by the first connection and the second connection so that a distance D1 between the first connection and the second connection is longer than a distance D2 between the second connection and the sensor 20.

Preferably, the saddle sensor assembly 12 further comprises a support structure 86 that is configured to support the first part 21 and the second part 22. Here, the support structure 86 is positioned between the third part 23 and the fourth part 24. The fourth part 24 is optional. Thus, if the fourth part 24 is omitted, then the support structure 86 is positioned between the second part 22 and the third part 23. The support structure 86 includes a damping part 88 that is configured to dampen a load applied to the first part 21. Here, the damping part 88 is formed by four elastic bodies. The elastic bodies of the damping part 88 are coiled compression springs in the illustrated embodiment. Alternatively, other types of springs or elastic bodies can be used in addition to or instead of a coiled compression springs.

As seen in FIGS. 13 and 15, in the illustrated embodiment, the saddle sensor assembly 12 further comprises a restricting part 90 that is configured to restrict movement of the first part 21 and the second part 22 relative to the support structure 82. Here, the restricting part 90 includes a bolt 92. The bolt 92 has a head portion 92a and a threaded shaft portion 92b. The threaded shaft portion 92b is attached to the fourth part 24. The bolt 92 extends through an opening 23a in the third part 23 such that the head portion 92a of the bolt 92 abuts a surface of the third part 23 that faces away from the fourth part 24. Thus, the elastic bodies 88 bias the head portion 92a into contact with the third part 23. When a rider sits on the saddle, the elastic bodies 88 are compressed. As a result, the first part 21, the second part 22 and the fourth part 24 move towards the third part 23 and the head portion 92a of the bolt 92 moves away from the third part 23. When a rider stands, the elastic bodies 88 are expanded. However, the first part 21, the second part 22 and the fourth part 24 do not bounce back unnecessarily as the head portion 92a of the bolt 92 is stopped at the third part 23.

Figure 12:
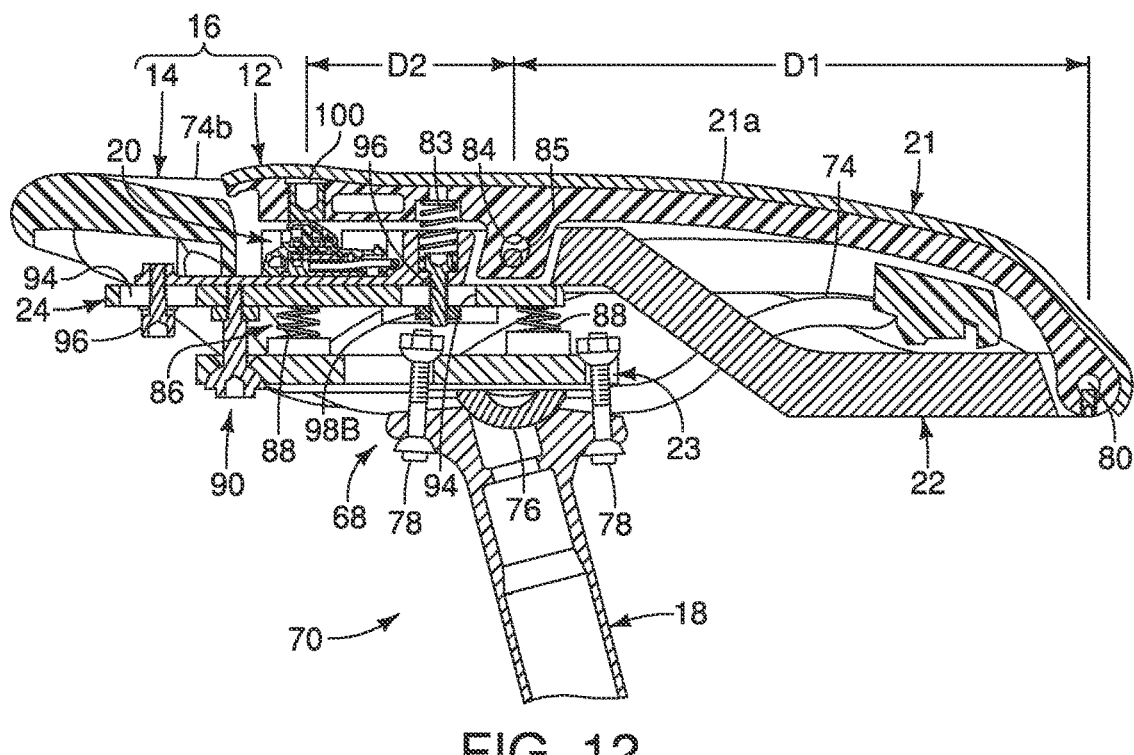
FIG. 12 is a cross sectional view of the saddle assembly illustrated in FIGS. 6 to 11 as seen along section line 12-12 of FIG. 9.
Figure 16:
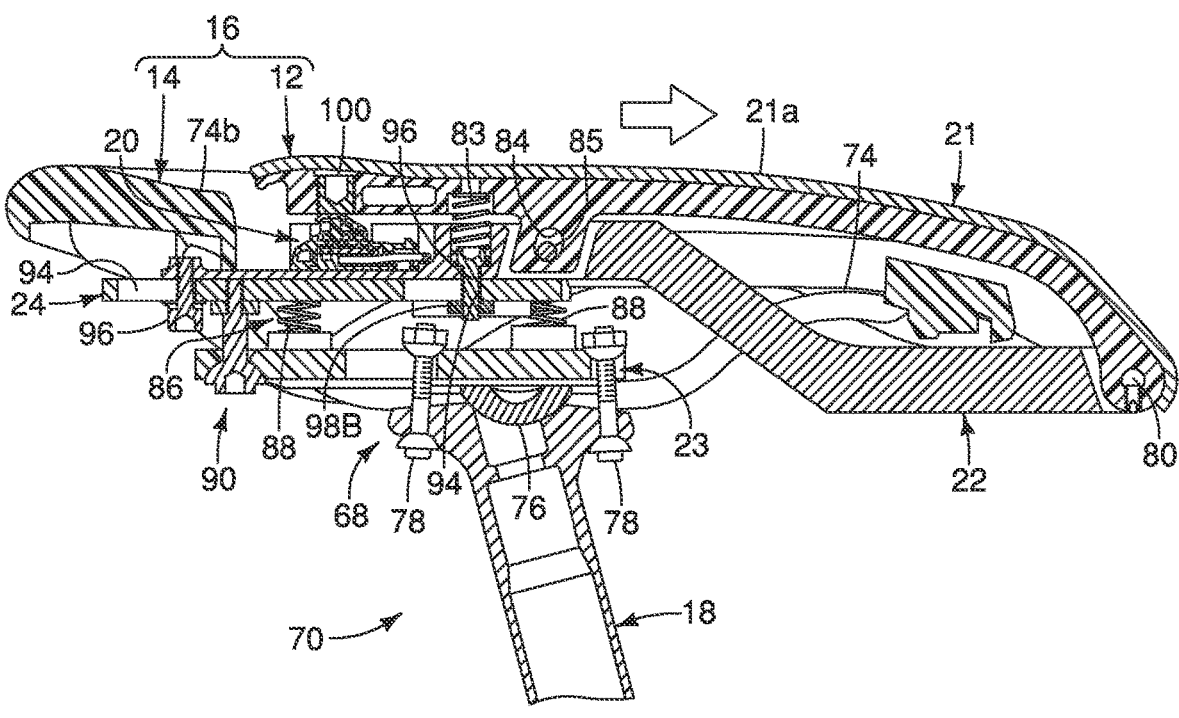
FIG. 16 is a cross sectional view, similar to FIG. 12, of the saddle assembly illustrated in FIGS. 6 to 11, but in which the saddle sensor assembly has been adjusted to a forward position relative to the saddle.
Figure 17:
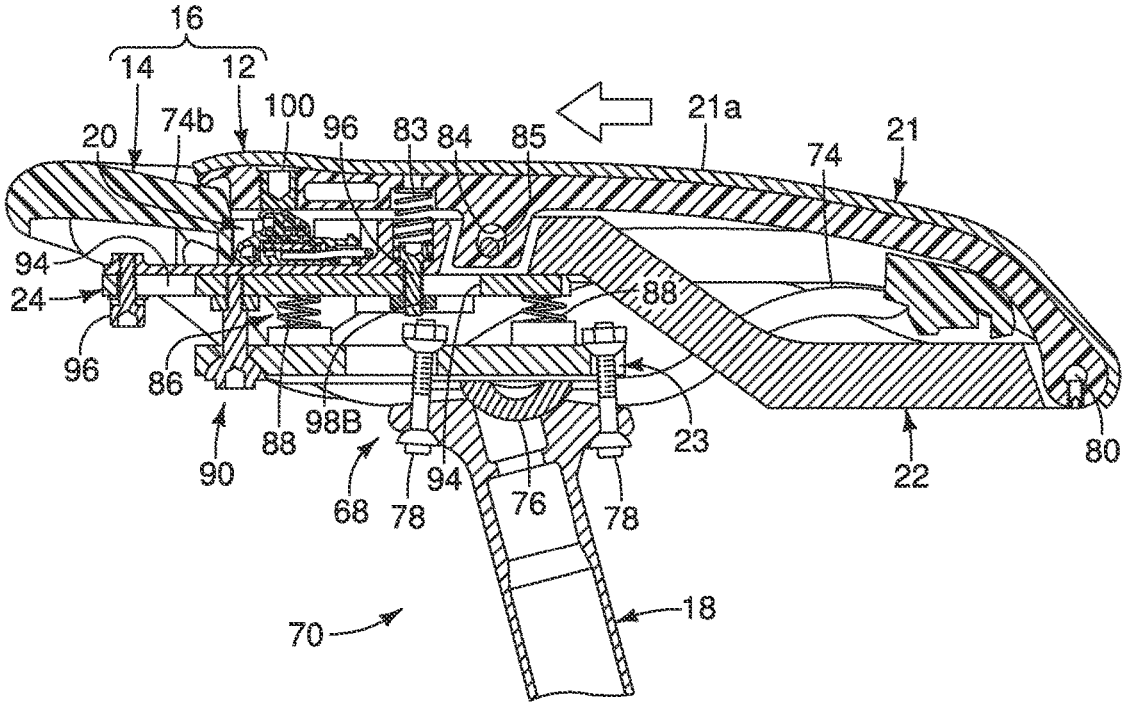
FIG. 17 is a cross sectional view, similar to FIG. 12, of the saddle assembly illustrated in FIGS. 6 to 11 but in which the saddle sensor assembly has been adjusted to a rearward position relative to the saddle.

As best seen in FIGS. 12, 16 and 17, the fourth part 24 includes at least one opening 94 extending in the longitudinal direction of the saddle 14. The fourth part 24 is adjustably connected to the second part 22 by at least one positioning member 96 that extends through the at least one opening 94 in the fourth part 24. Here, the fourth part 24 includes a pair of openings 94 and a pair of positioning members 96. The openings 94 are elongated slots that extending in the longitudinal direction of the saddle 14. Here, the positioning members 96 are positioning bolts that are fastened to the second part 22. In particular, one of the positioning members 96 is screwed into a threaded bore 98A of the second part 22, and the other one of the positioning members 96 is screwed into a nut 98B. The nut 98B is fixed between a pair of ribs provided on the back side of the second part 22 so that the nut 98B does not rotate with the positioning member 96. In this way, the first part 21 and the second part 22 are adjustably connected to the fourth part 24 in a longitudinal direction of the saddle 14. In other words, the positioning members 96 are configured to adjust a longitudinal position of the first part 21 and the second part 22 relative to the third part 23 and the fourth part 24.

The saddle sensor assembly 12 further comprises a sensed element 100 protruding downward from the first part 21 toward the sensor 20 provided to the second part 22. Here, the sensed element 100 is adjustably coupled to the first part 21 to adjust a distance between the sensed element 100 and the sensor 20. In the illustrated embodiment, the sensed element 100 is threadedly coupled to the first part 21. Thus, by turning the sensed element 100, the sensed element 100 can be adjusted towards or away from the sensor 20. Here, the sensor 20 is basically a contact switch that is activated by the sensed element 100 contacting and depressing a portion of the sensor 20 as explained later. In the illustrated embodiment, as seen in FIGS. 12 and 13, the sensed element 100 is adjusted so that the sensed element 100 contacts the sensor 20 when the saddle 14 and the first part 21 are unloaded. In this way, the sensed element 100 starts to operate the sensor 20 immediately upon movement of the first part 21 towards the second part 22. However, if desired, the sensed element 100 can be adjusted so that a gap exists between the sensed element 100 and the sensor 20 when the saddle 14 and the first part 21 are unloaded. With this type of adjustment, the sensed element 100 does not contact the sensor 20 until the first part 21 moves a predetermined amount towards the second part 22. Alternatively, depending on the type of the sensor 20, the sensed element 100 can be adjusted so that the sensor 20 is preloaded.

Here, as seen in FIGS. 13 and 15, in the first embodiment, the sensor 20 includes a contact sensor 102. Here, the contact sensor 102 is a pressure operated element that detects a pressure applied to the sensor 20 by the sensed element 100. The sensor 20 includes a base member 104, an input portion 106 and an actuator portion 108. The base member 104 is attached to the second part 22, while the input portion 106 is pivotally attached to the base member 104. The input portion 106 of the the sensor 20 is configured to be depressed by the sensed element 100 when a rider sits on the saddle 14. The actuator portion 108 is positioned between the input portion 106 and the contact sensor 102, and holds the input portion 106 in a non-operated position in which the actuator portion 108 is spaced from the contact sensor 102, or just touching the contact sensor 102 without depressing the contact sensor 102. The actuator portion 108 is preferably a one-piece member that is entirely made of an elastomeric material such as rubber. The actuator portion 108 has a resilient hinge portion movably coupling the actuator portion 108 to the base member 104. The resilient hinge portion of the actuator portion 108 is configured to temporarily deform when the input portion 106 is depressed by the sensed element 100. As a result of the temporary deformation of the resilient hinge portion of the actuator portion 108, the actuator portion 108 contacts and depresses the electric switch 106 to output a signal to the controller 25 via the electrical wire W. Once the rider releases the operating force from the input portion 106, the actuator portion 108 returns to its pre-deformed state in which the input portion 106 is also returned to the non-operated position.

In the assembling process, it is preferable to attach the first part 21 to the second part 22 before attaching the saddle sensor assembly 12 and the saddle 14 to the seatpost 18. At first, the first part 21 and the second part 22 are separate, without the pivot pin 80 or the pin 85. Then the first part 21 is attached to the second part 22 with the seat portion 72 of the saddle 14 in between, so that the first part 21 is located in the opening 72a and also the first part 21 and the second part 22 enclose the bridge portion of the front of the saddle 14. Then the pivot pin 80 is inserted. However, in a situation like FIG. 8, it is hard to insert the pin 85 as the seat portion 72 disturbs it, and then the first part 21 and the second part 22 can be rotated downwards around the bridge portion so that the hole for the pin 85 appears. After the first part 21 is attached to the second part 22 by inserting the pin 85, the saddle sensor assembly 12 and the saddle 14 can be attached to the seatpost 18.

Figure 18:
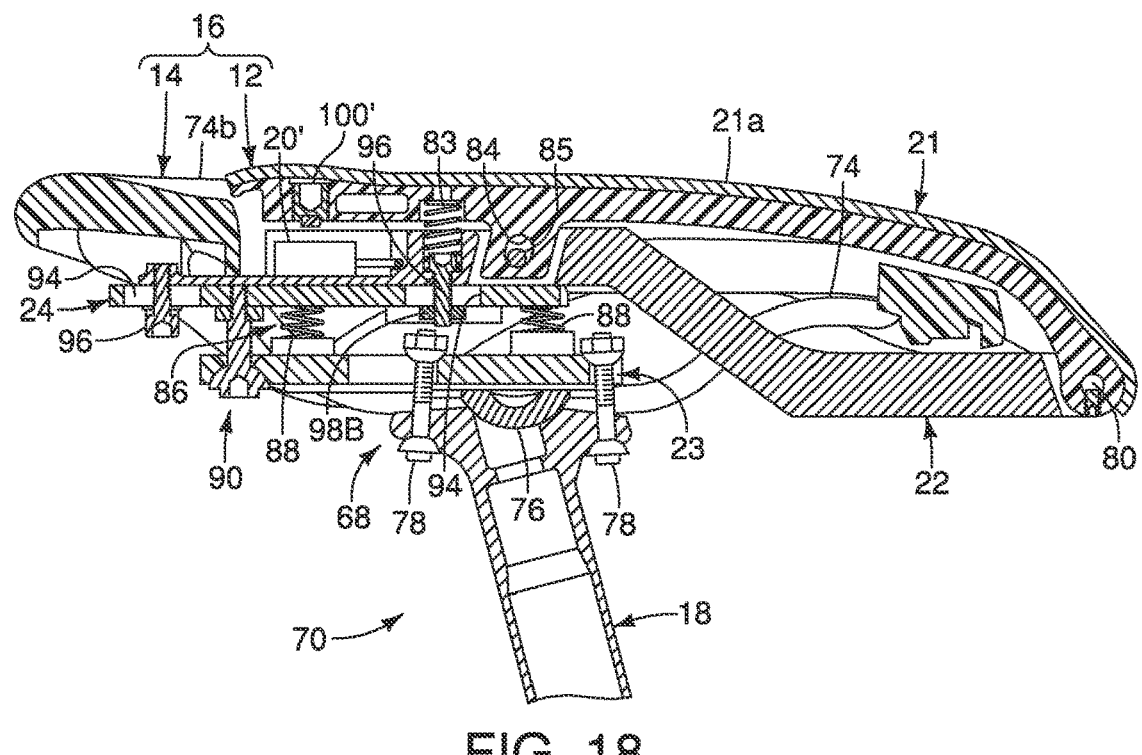
FIG. 18 is a cross sectional view, similar to FIG. 12, of the saddle assembly illustrated in FIGS. 6 to 17, but in which a non-contact sensor is used in place of the contact sensor.
Figure 19:
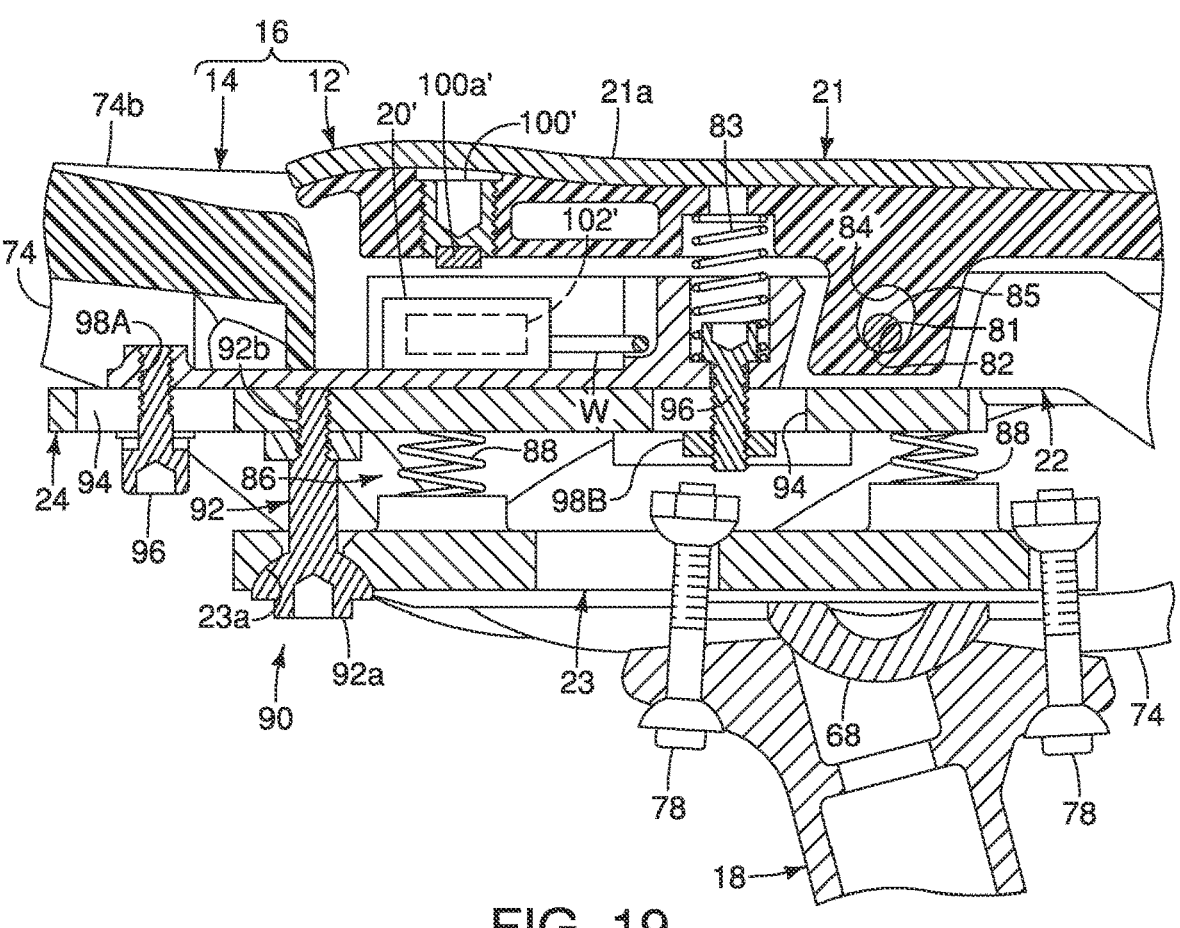
FIG. 19 is an enlarged partial cross sectional view of a portion of the saddle assembly illustrated in FIG. 18.

Referring now to FIGS. 18 and 19, the saddle assembly 16 has been modified in accordance with a second embodiment. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the saddle assembly 16 is provided with a sensor 20' and a sensed element 100' instead of the sensor 20 and the sensed element 100 used in the first embodiment. Here, the sensor 20' includes a non-contact sensor 102'. Also, here, the sensed element 100' includes a magnet 100a'. The magnet 100a' is fixed to the sensed element 100' and moves with the sensed element 100' as the first part 21 moves relative to the second part 22. Here, the sensed element 100' includes a recess, and the magnet 100a' is disposed in the recess of the sensed element 100'. The magnet 100a' can be fixed to the sensed element 100' by bonding, a thread connection, or any other suitable connection. Alternatively, the magnet 100a' can be a portion of the sensed element 100' that is magnetized, in which case, a separate magnet can be omitted. The non-contact sensor 102' is configured to detect the movement of the sensed element 100' as the magnet 100a' moves towards or away from the non-contact sensor 102'. In particular, the non-contact sensor 102' senses the strength of the magnetic field of the magnet 100a' of the sensed element 100'. When a rider sits on the seat portion 74, the first part 21 moves towards the second part 22. As a result, the magnet 100a' of the sensed element 100' moves closer to the non-contact sensor 102', and the strength of the magnetic field of the the magnet 100a' detected by the non-contact sensor 102' increases. When a rider stands, the first part 21 moves away from the second part 22. As a result, the magnet 100a' of the sensed element 100' moves away from the non-contact sensor 102', and the strength of the magnetic field of the the magnet 100a' detected by the non-contact sensor 102' decreases. And by turning the sensed element 100', the magnet 100a' can be adjusted towards or away from the non-contact sensor 102'.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a human-powered vehicle (e.g., bicycle) in an upright, riding position and equipped with the a saddle sensor assembly. Accordingly, these directional terms, as utilized to describe the * should be interpreted relative to a human-powered vehicle (e.g., bicycle) in an upright riding position on a horizontal surface and that is equipped with the saddle sensor assembly. The terms "left" and "right" are used to indicate the "right" when referencing from the right side as viewed from the rear of the human-powered vehicle (e.g., bicycle), and the "left" when referencing from the left side as viewed from the rear of the human-powered vehicle (e.g., bicycle).

The phrase "at least one of" as used in this disclosure means "one or more" of a desired choice. For one example, the phrase "at least one of as used in this disclosure means "only one single choice" or "both of two choices" if the number of its choices is two. For another example, the phrase "at least one of" as used in this disclosure means "only one single choice" or "any combination of" equal to or more than two choices" if the number of its choices is equal to or more than three. Also, the term "and/or" as used in this disclosure means "either one or both of".

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention.

The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A saddle sensor assembly:
a saddle having an opening;
a load input configured to receive a load from a rider, and configured to be movable due to the load applied by the rider, the load input being disposed in the opening in the saddle;
a sensor support provided between a seatpost and the load input,
the load input being separately formed from the sensor support and the saddle so that the load input is configured to be movable relative to the sensor support between a first position and a second position, the load input being movably and pivotally connected to the sensor support about a fixed pivot point to facilitate movement between the first and second positions, the load input being an upper surface configured to be positioned above a seat surface of the saddle in a case where the saddle sensor assembly is attached, the upper surface of the load input being movable between the first and second positions relative to the sensor support;
the fixed pivot point being a pivot pin connecting a front end of the load input and a front end of the sensor support, the load input being connected to the sensor support through the opening in the saddle, the pivot pin being disposed at a front end of the saddle;
a mount supporting the load input and the sensor support, and configured to be attached to at least one of the saddle and the seatpost; and
a sensor supported by the sensor support, wherein
the sensor is configured to detect relative movement of at least one of the load input and the sensor support between the first position and the second position.

2. The saddle sensor assembly according to claim 1, wherein
the load input is connected to the sensor support by a first connection and a second connection so that a distance between the first connection and the second connection is longer than a distance between the second connection and the sensor.

3. The saddle sensor assembly according to claim 1, further comprising
a sensed element protruding downward from the load input toward the sensor provided to the sensor support.

4. The saddle sensor assembly according to claim 3, wherein the sensed element is adjustably coupled to the load input to adjust a distance between the sensed element and the sensor.

5. The saddle sensor assembly according to claim 4, wherein
the sensed element is threadedly coupled to the load input.

6. The saddle sensor assembly according to claim 1, wherein
the sensor includes a contact sensor.

7. The saddle sensor assembly according to claim 1, wherein
the sensor includes a non-contact sensor.

8. The saddle sensor assembly according to claim 1, further comprising
an adjuster adjustably connecting the sensor support in a longitudinal direction of the saddle.

9. The saddle sensor assembly according to claim 8, wherein
the adjuster includes at least one opening extending in the longitudinal direction of the saddle, and
the adjuster is adjustably connected to the sensor support by at least one positioning member that extends through the at least one opening in the adjuster.

10. The saddle sensor assembly according to claim 1, wherein
the mount is configured to be attached to a pair of saddle rails of the saddle.

11. The saddle sensor assembly according to claim 1, wherein
the mount is integrated with a saddle clamp of the seatpost.

12. The saddle sensor assembly according to claim 1, further comprising
a support structure configured to support the load input and the sensor support, wherein
the support structure includes a damping part configured to dampen a load applied to the load input.

13. The saddle sensor assembly according to claim 12, further comprising
a restricting part configured to restrict movement of the load input and the sensor support relative to the support structure.

14. A human-powered vehicle control system comprising the saddle sensor assembly according to claim 1, and further comprising
a controller configured to receive a signal to the sensor, and configured to determine a rider's condition.

15. The human-powered vehicle control system according to claim 14, wherein
the rider's condition includes a rider's posture.

16. The human-powered vehicle control system according to claim 15, wherein
the rider's posture includes at least one of sitting and standing.

17. The human-powered vehicle control system according to claim 14, wherein
the rider's condition includes an estimation of a rider's fatigue.

18. The human-powered vehicle control system according to claim 14, further comprising
a data storage device electrically connected to the controller, and configured to store a reference value to determine the rider's condition.

19. The human-powered vehicle control system according claim 14, further comprising

21

22 a wireless communicator electrically connected to the controller, and configured to wirelessly transmit the rider's condition from the controller.

20. The human-powered vehicle control system according to claim 19, wherein the wireless communicator is configured to wirelessly receive commands for the controller.

21. The human-powered vehicle control system according to claim 14, further comprising a display device configured to receive information from the controller, and configured to display the rider's condition.

22. The human-powered vehicle control system according to claim 14, further comprising a power source configured to supply electric power to the human-powered control system.

23. The human-powered vehicle control system according to claim 14, further comprising a human-powered vehicle component configured to receive commands from the controller to perform a predetermined action according to the rider's condition.

24. A saddle assembly comprising:

a saddle having an opening; and a saddle sensor assembly attached to the saddle, the saddle sensor assembly comprising a load input configured to receive a load from a rider, and configured to be movable due to the load applied by the rider, the load input being disposed in the opening in the saddle;

a sensor support provided between a seatpost and the load input, the load input being separately formed from the sensor support and the saddle so that the load input is configured to be movable relative to the sensor support between a first position and a second position, the load input being movably and pivotally connected to the sensor support about a fixed pivot point to facilitate movement between the first and second positions, the load input being an upper surface configured to be positioned above a seat surface of the saddle in a case where the saddle sensor assembly is attached, the upper surface of the load input being movable between the first and second positions relative to the sensor support;

the fixed pivot point being a pivot pin connecting a front end of the load input and a front end of the sensor support, the load input being connected to the sensor support through the opening in the saddle, the pivot pin being disposed at a front end of the saddle;

a mount supporting the load input and the sensor support, and attached to the saddle; and a sensor supported by the sensor support, wherein the sensor is configured to detect relative movement of at least one of the load input and the sensor support between the first position and the second position.

25. A seatpost assembly comprising a seatpost; and a saddle sensor assembly attached to the seatpost, the saddle sensor assembly comprising a load input configured to receive a load from a rider, and configured to be movable due to the load applied by the rider;

a sensor support provided between the seatpost and the load input, the load input being separately formed from the sensor support and a saddle so that the load input is configured to be movable relative to the sensor support between a first position and a second position, the load input being movably and pivotally connected to the sensor support about a fixed pivot point to facilitate movement between the first and second positions, the load input being an upper surface configured to be positioned above a seat surface of the saddle in a case where the saddle sensor assembly is attached, the upper surface of the load input being movable between the first and second positions relative to the sensor support;

the fixed pivot point being a pivot pin connecting a front end of the load input and a front end of the sensor support, the load input being connected to the sensor support through the opening in the saddle, the pivot pin being disposed at a front end of the saddle;

a mount supporting the load input and the sensor support, and attached to the seatpost; and a sensor supported by the sensor support, wherein the sensor is configured to detect relative movement of at least one of the load input and the sensor support between the first position and the second position.

* * * * *